United States Patent [19]
Brennan, Jr. et al.

[11] Patent Number: 5,155,481
[45] Date of Patent: Oct. 13, 1992

[54] TWO AND THREE WIRE UTILITY DATA COMMUNICATIONS SYSTEM

[75] Inventors: William J. Brennan, Jr., Montgomery; David R. Hamilton, Auburn; Warren C. Wynn, Jr., Montgomery, all of Ala.

[73] Assignee: Schlumberger Industries, Inc., Atlanta, Ga.

[21] Appl. No.: 528,391

[22] Filed: May 25, 1990

[51] Int. Cl.$^5$ .................. G08B 19/02; H04Q 9/00
[52] U.S. Cl. .................. 340/870.02; 340/870.03; 340/825.54; 340/310 R; 340/310 A; 346/14 MR
[58] Field of Search .................. 379/40, 100; 364/464.04, 465; 346/14 R, 14 MR; 324/103 R, 110, 113, 118, 153; 340/310 A, 310 R, 825.54, 825.56, 870.02, 870.03

[56] References Cited

U.S. PATENT DOCUMENTS

| | | | |
|---|---|---|---|
| 3,754,250 | 8/1973 | Bruner | 340/870.03 |
| 3,914,757 | 10/1975 | Finlay, Jr. et al. | 340/870.03 |
| 4,008,458 | 2/1977 | Wensley | 340/870.02 |
| 4,085,287 | 4/1978 | Kullmann et al. | |
| 4,196,417 | 4/1980 | Fasching et al. | |
| 4,208,653 | 6/1980 | Abe | |
| 4,352,104 | 9/1982 | Mizuta et al. | |
| 4,361,838 | 11/1982 | Mizuta | |
| 4,463,354 | 7/1984 | Sears | |
| 4,504,831 | 3/1985 | Jahr et al. | |
| 4,532,510 | 7/1985 | Bertrand et al. | |
| 4,569,045 | 2/1986 | Schieble et al. | |
| 4,573,041 | 2/1986 | Kitagawa et al. | |
| 4,578,540 | 3/1986 | Bors et al. | 379/40 |
| 4,646,084 | 2/1987 | Burrowes et al. | 340/870.03 |
| 4,652,877 | 3/1987 | Gray | |
| 4,707,852 | 11/1987 | Jahr et al. | |
| 4,758,836 | 7/1988 | Scuilli | |
| 4,782,341 | 11/1988 | Gray | |
| 4,852,152 | 7/1989 | Honick | |

Primary Examiner—Donald J. Yusko
Assistant Examiner—John Giust
Attorney, Agent, or Firm—Dale V. Gaudier

[57] ABSTRACT

A two wire/three wire utility data communications system for remotely reading utility meter registers. In the two wire version, a hand-held reading unit is inductively coupled over two wires via a port located remotely from a meter register. Alternatively, a meter interface unit (MIU) may be connected directly to the register via three wires. Each register includes one or more wheel position encoders. An AC interrogation signal is applied by the reading unit to encoder circuitry at the meter which powers the circuitry and causes the position of each encoder wheel to be read. In the two wire mode, register display information (e.g. the current meter reading) is transmitted back to the reading unit by varying the load (impedance) presented by the register side of the circuit. This causes a corresponding variation of the amount of current drawn from the reading unit. The current-modulated signal is decoded by the reading unit and converted into a register reading. The system can also operate in a three wire mode and read older fourteen wire encoded registers. Other features include remote programmability of register characteristics, the ability to interrogate multiple registers which share a common data bus, verification of encoder wheel positions before accepting a reading, real-time flow rate/leak detection, pulse output, and the capability of reading compound meters (i.e. meters having two registers to separately measure high/low flow rates).

31 Claims, 12 Drawing Sheets

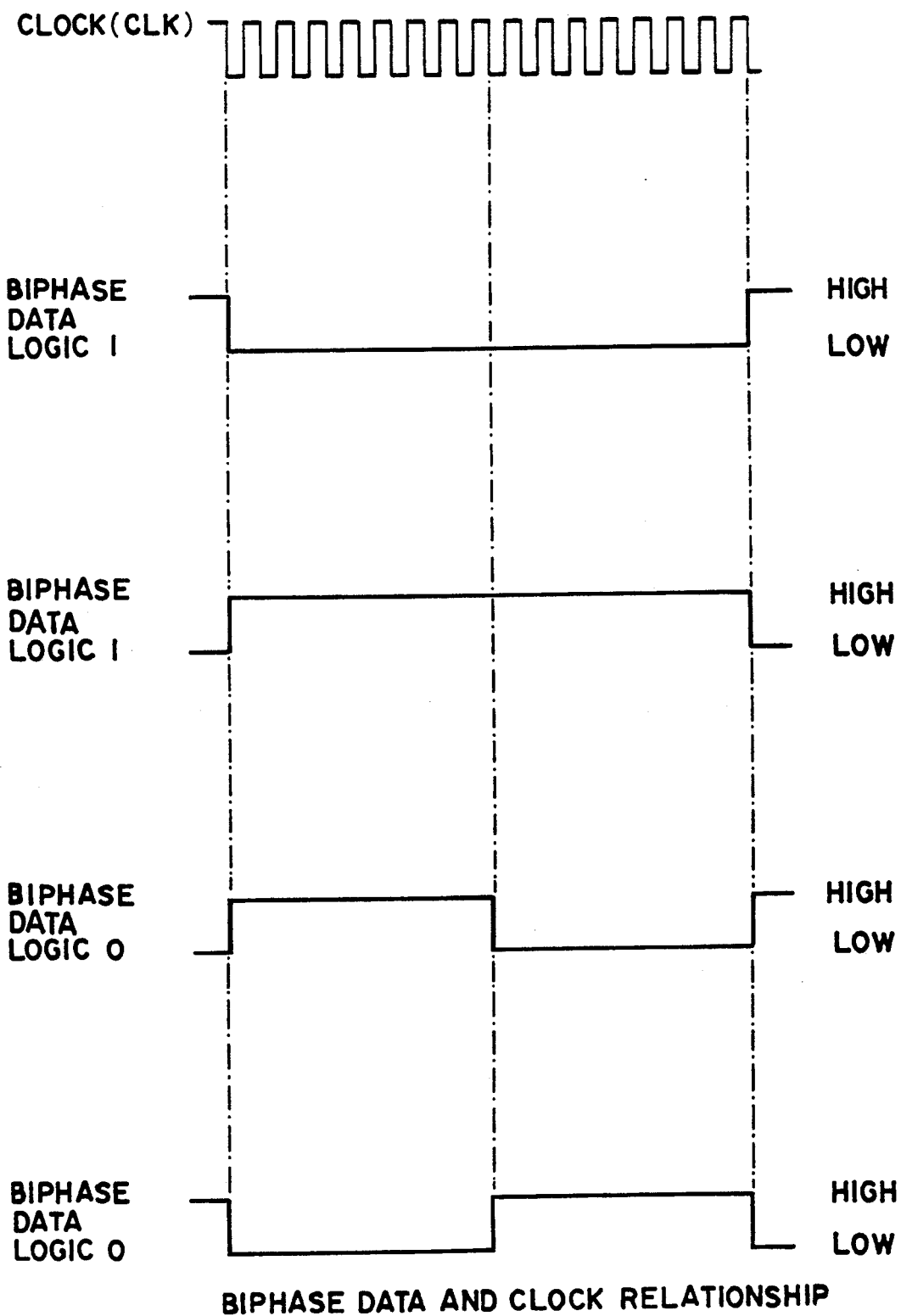
Fig_5

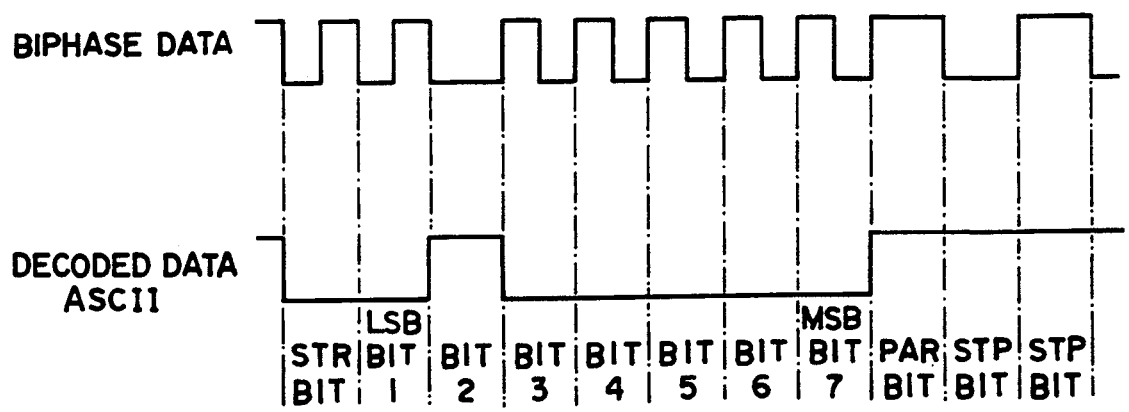
Fig_6
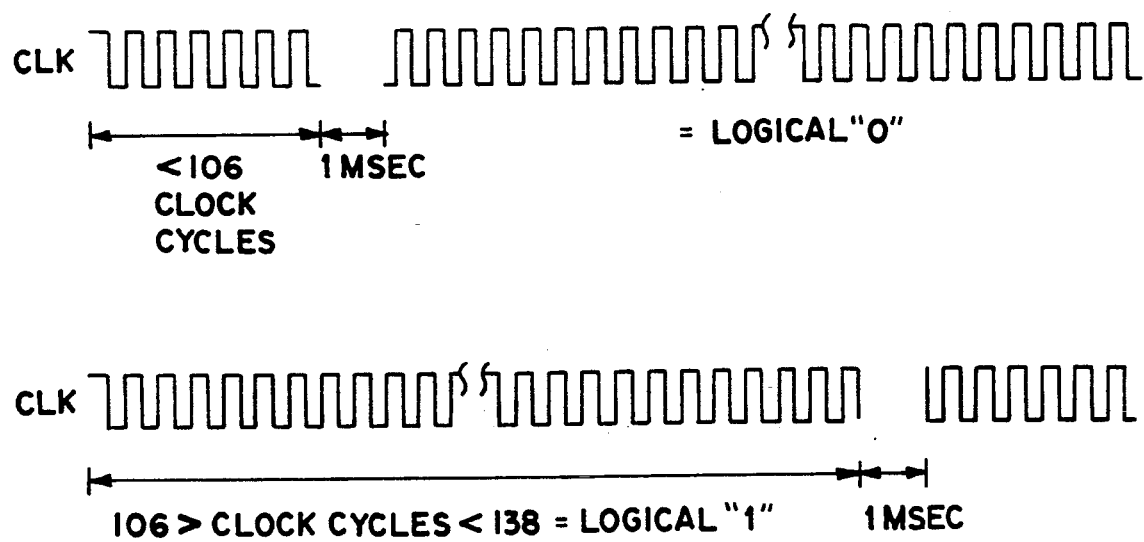
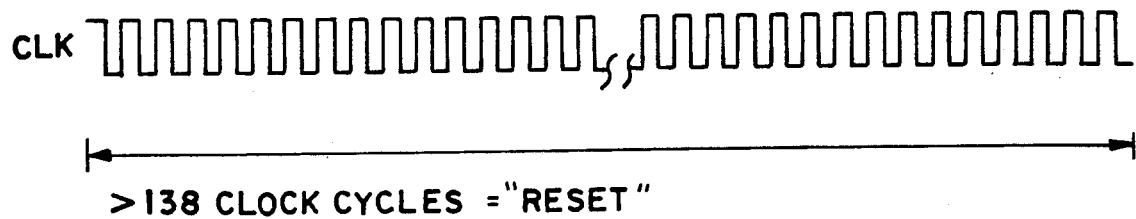
Fig_7

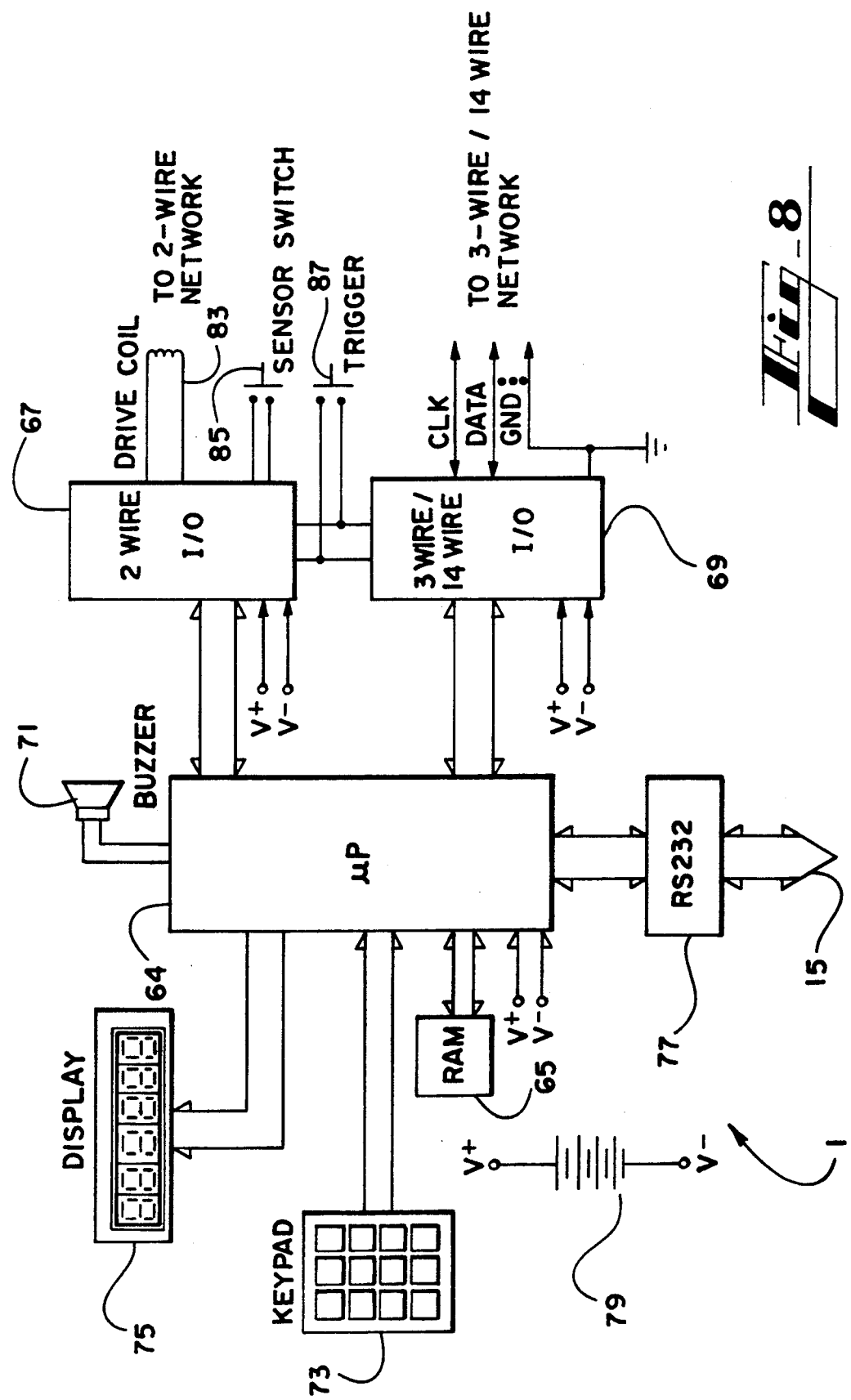

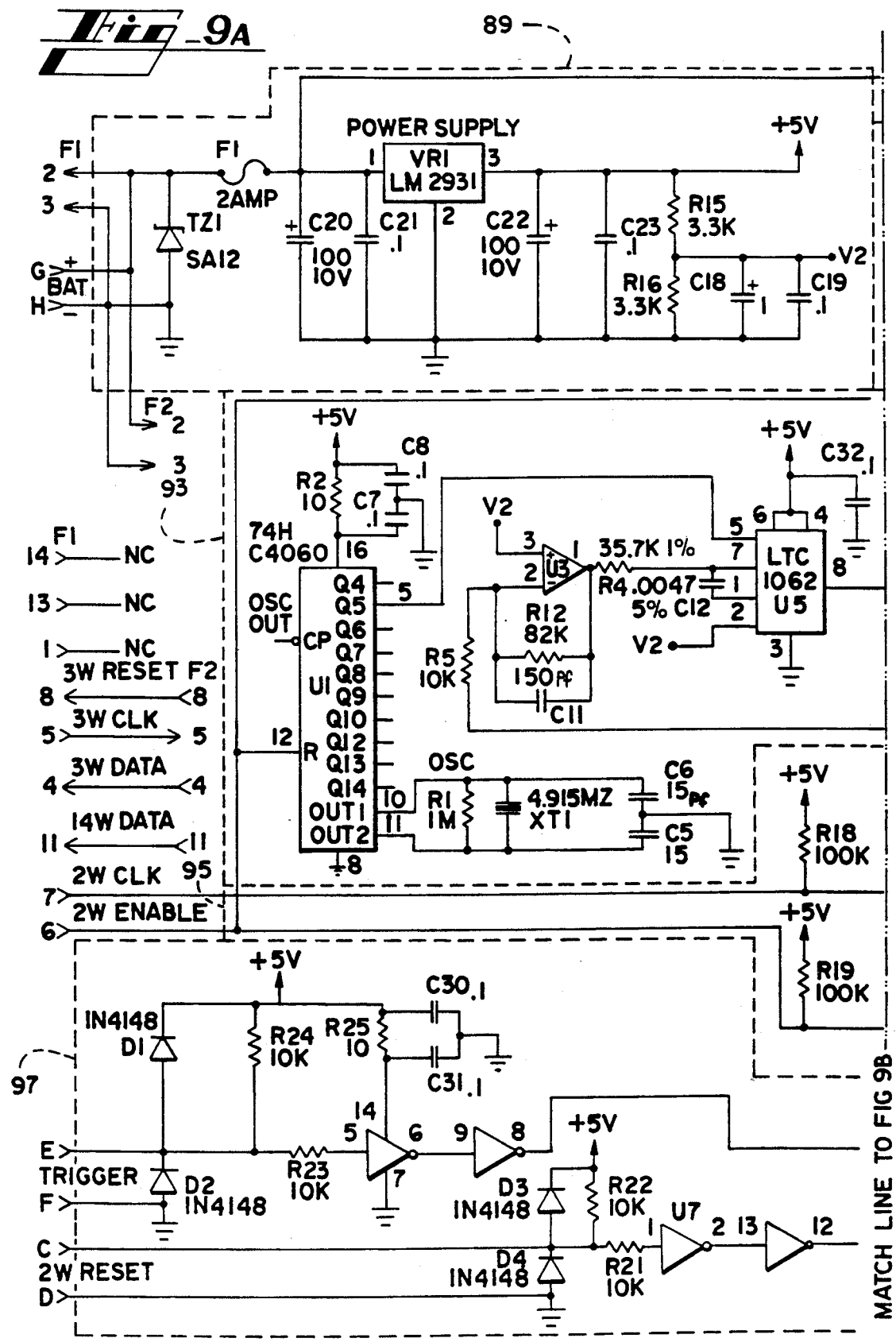

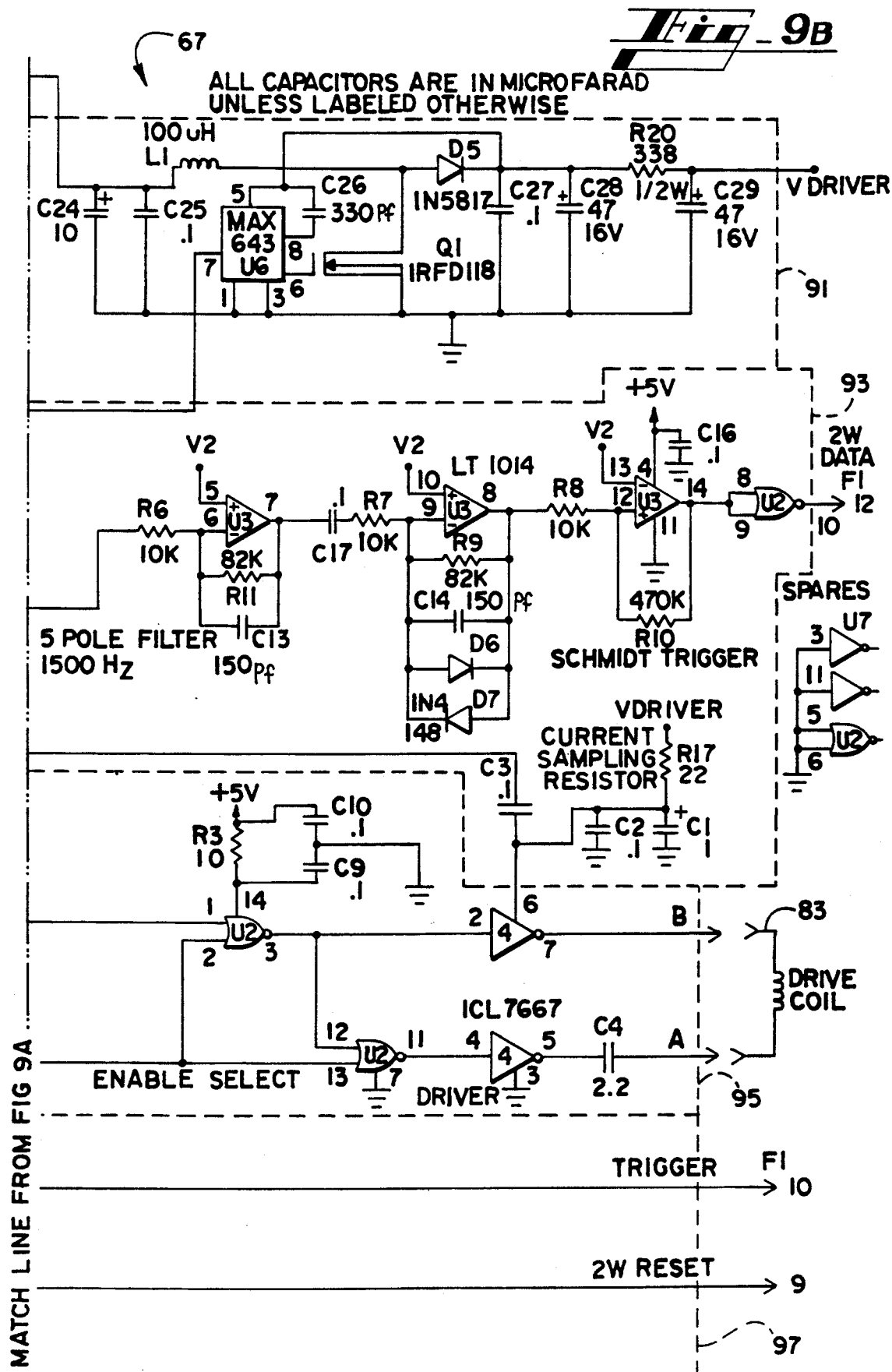
Fig_9B

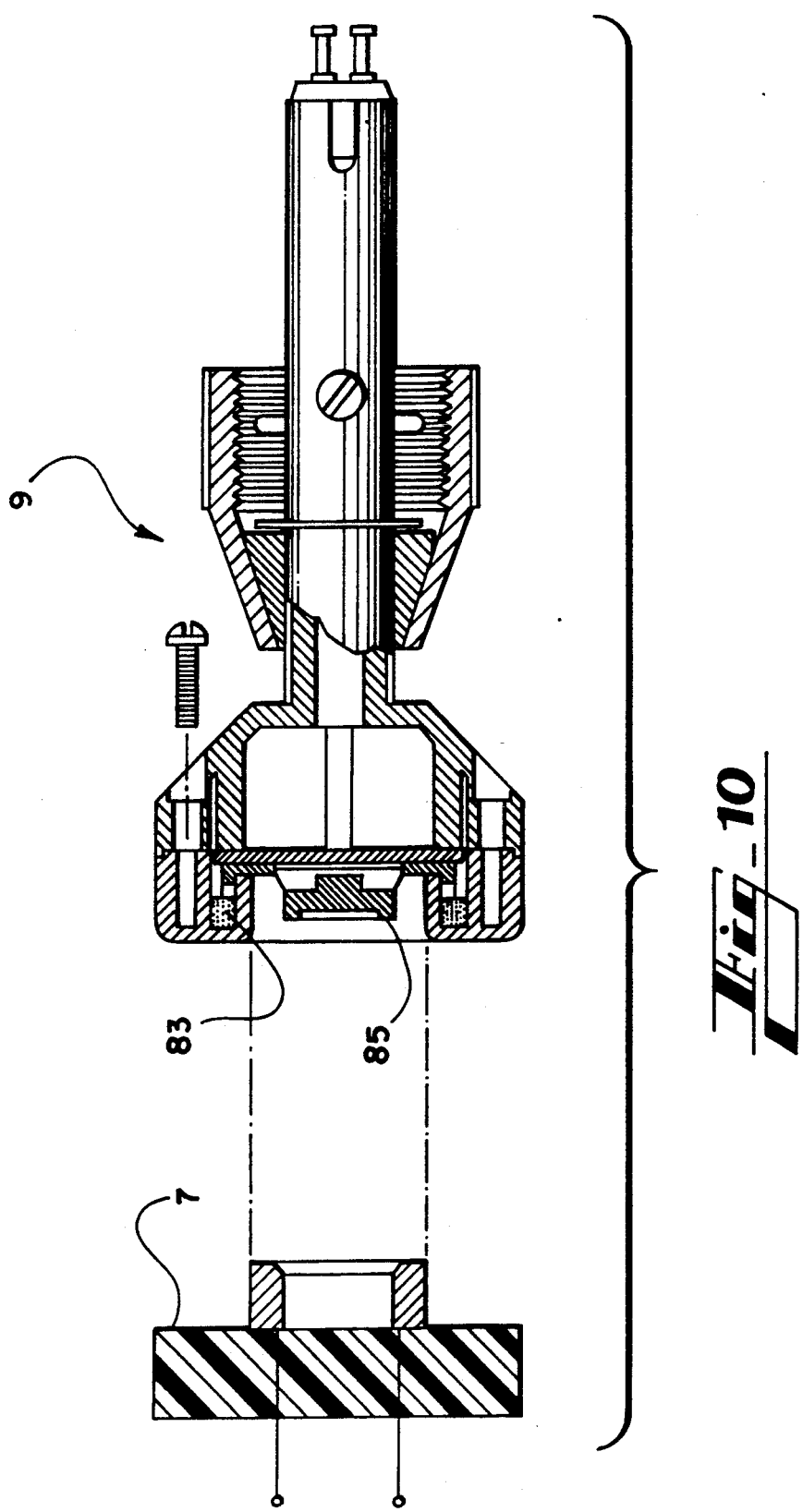

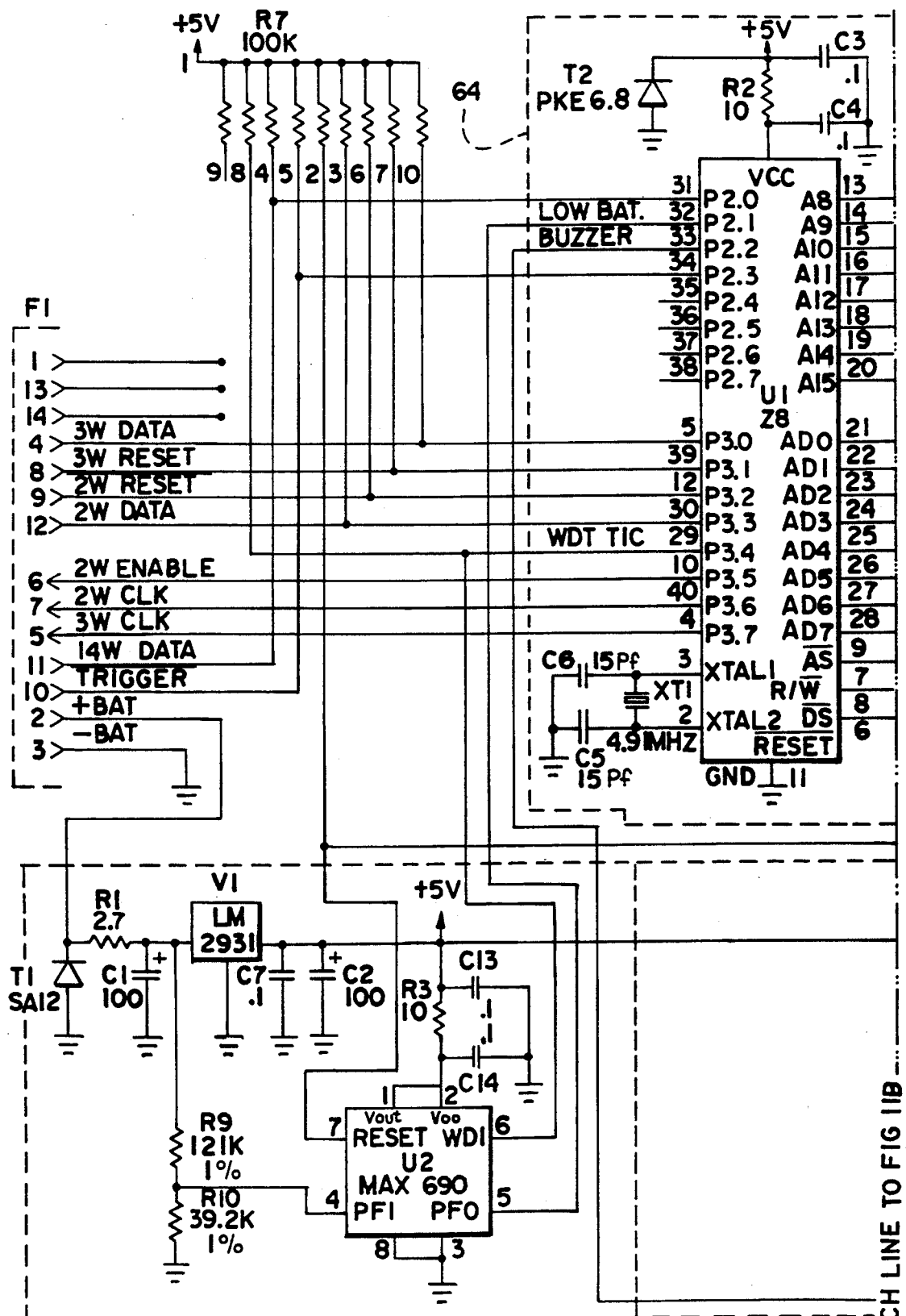
Fig_11A

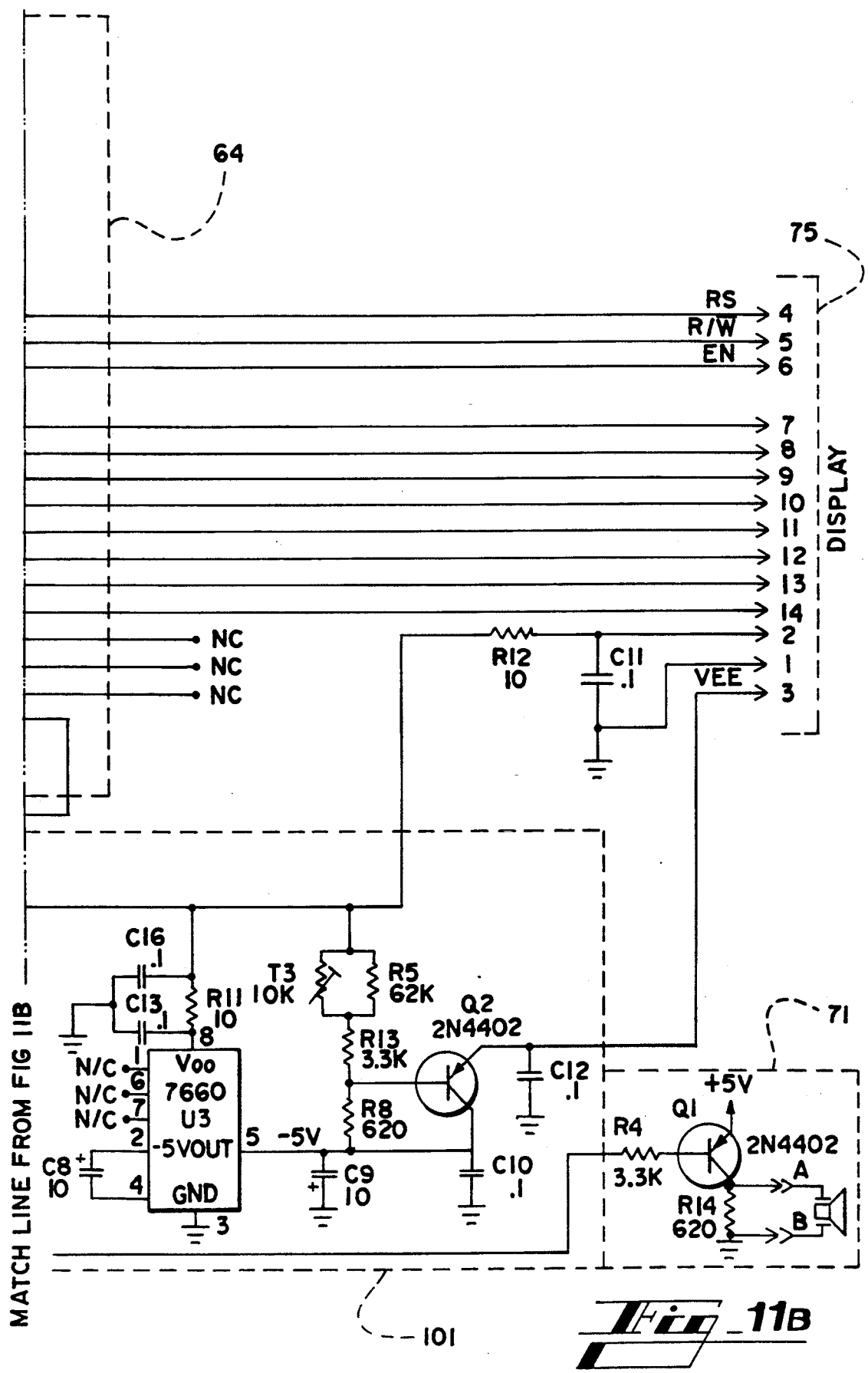

TWO AND THREE WIRE UTILITY DATA COMMUNICATIONS SYSTEM

BACKGROUND OF THE INVENTION

1. Field of the Invention

The invention relates to the field of data communications, and more particularly to a system for communicating utility meter readings over two or three wire lines.

2. Description of the Prior Art

Utility data communication systems are used to transmit consumption data from a meter, such as an electric, gas, or water meter, to remote meter reading units. In these types of systems, each meter includes an encoder which converts consumption information displayed by a mechanical or electronic register associated with the meter to a form which can be transmitted over wires or the like to a remotely located meter reading unit. One such encoder for use with meter registers is shown in U.S. Pat. No. 4,085,287. As shown in this patent, a series of conductive pads and a movable contact are associated with one or more odometer-type register display wheels. The position of the movable contact with respect to the conductive pads indicates the register wheel position and hence the quantity being displayed by the meter register. Upon interrogation by a remote meter reading unit, the register position information is transmitted via three conductive wires to the remote meter reading unit. Data is transmitted from the encoder to the remote reader.

As set forth in U.S. Pat. No. 4,085,287, the remote unit may be portable and include a plug for insertion into a receptacle connected to the three wire data line. A meter reader thus can carry the portable meter reading unit and, by plugging it into the appropriate receptacle, remotely read an individual meter register.

It is also known to connect encoded meter registers of the type shown in U.S. Pat. No. 4,085,287 to a device commonly known as a meter interface unit or MIU. Such an arrangement is shown in U.S. Pat. No. 4,852,152. In this arrangement, each encoded register is permanently connected to an MIU. In turn, the MIU contains an interface allowing it to respond to interrogation signals applied over a telephone line. A utility may call the MIU, via special telephone central office equipment, to "wake it up". The MIU then interrogates one or more encoded registers connected to it and sends the meter reading data over the telephone line back to the utility.

An alternative to the three wire encoded utility meter data transmission system shown in U.S. Pat. No. 4,085,287, is a two-wire, inductively coupled utility meter data communication system such as shown in U.S. Pat. Nos. 4,782,341, 4,758,836, 4,652,877 and 4,463,354. In this type of system, a portable meter reading unit is provided with an inductive loop or coil which mates with a similar loop or coil arranged on a receptacle. The coil of the receptacle is coupled via two lines to a meter register. The coil of the reading unit is brought into proximity with the coil of the receptacle and an AC interrogation signal is applied to the coil connected to the meter. This AC signal is transmitted to the remote meter register by means of the mutual inductive coupling of the two coils. This interrogation signal to used to "wake up" the encoded meter register which then sends back the meter reading data by modulating an AC carrier signal. The AC carrier signal can be generated internally by the meter encoder or may be the AC interrogation signal itself.

While the above meter reading systems have gained wide acceptance, they are subject to several drawbacks and limitations. While the inductively coupled two-wire meter reading systems described above allow data communications to take place between an encoded meter register and a portable meter reading unit, this arrangement is unsuitable for use with conventional meter interface units which require direct, three-wire connection to an encoded meter register for data communications. In addition, both the two-wire and three-wire meter reading systems using portable reading units require the use of a separate wired receptacle for each encoded meter register which is to be read. This presents an inconvenience to the meter reader especially in situations where there are a large number of encoded meters to be read within a small geographical area. This can occur in office buildings and high density housing (e.g. apartments, condominiums, townhouses, etc.) where each unit is individually metered. The meter reader in such a situation would be faced with the time consuming task of having to plug and unplug his portable meter reading unit tens and possibly hundreds of times in order to individually read each of the encoded meters. The use of a separate receptacle for each encoded meter obviously increases the cost of installation for the utility, also.

In addition, each different utility (e.g. gas, water, and electric) has traditionally provided their own separate receptacles for reading of their respective meters. These utilities not infrequently utilize different data formats from each other making it infeasible for a single meter reader to read all the meters of different types of utilities.

It would therefore be of great benefit for utilities to have a data communication system for reading utility meters which could be used in both two-wire inductive coupling and three-wire metallic coupling modes and which is also adaptable for connection to an MIU for the purpose of central meter reading. It would also be of great benefit to have a meter reading system where multiple remote meter registers could be linked together over a single set of lines to a single receptacle to enable all these meters to be read by a portable meter reading unit without the need for separate receptacles and connections to each one. Furthermore, it would be of great benefit if the meter reading unit or MIU were able to automatically recognize and read different types of meters and meters of different manufacturers.

SUMMARY OF THE INVENTION

The foregoing desired features are provided by the present invention which concerns a system for communicating data between a utility meter or the like over at least two wire lines. The system includes a remote reader/programmer coupled to the lines, with the remote reader/programmer having a signal generator and a data storage area. A register encoder is coupled to a meter register and is responsive to a quantity of a commodity being measured by the utility meter and displayed by the register. The encoder is responsive to an interrogate signal produced by the signal generator and produces a modulated data signal indicative of the quantity measured by the meter and communicates this data signal to the remote reader/programmer via the lines.

The reader/programmer stores the quantity indicative data signal in the data storage area.

The interrogate signal is modulated by the encoder so as to vary the current flowing between the remote reader/programmer and the encoder when the remote reader/programmer and encoder are coupled via two wires. When coupled via at least three wires, the interrogate signal acts as a clock and this signal is used by the encoder to generate an encoded data signal. This data signal is indicative of, among other things, the quantity of the commodity being measured by the meter register.

Thus, the utility meter data communication system of the present invention is adaptable for operation in both two-wire and three-wire modes. Preferably, when operating in the two-wire mode, the remote reader/programmer and encoder are inductively coupled. The encoder includes circuitry for varying an impedance in accordance with data representing the quantity being measured by the meter to cause the current flowing between the encoder and the remote reader/programmer to be modulated in accordance with the data.

When in the three-wire mode, the remote reader/programmer and encoder are directly, electrically coupled over at least three wires with the first wire carrying clock signals generated by the reader/programmer, a second line carrying data signals from the encoder, and a third line constituting electrical ground. The clock signals are applied by the reader/programmer to the encoder. The encoder includes circuitry for generating an encoded data signal which represents the quantity being measured by the meter.

In a preferred embodiment, a plurality of encoders may be coupled over either the two-wire or three-wire lines in parallel and to a common reader/programmer. The reader/programmer sequentially polls each of the encoders. While each encoder may have its own unique identifying number or address (e.g. a serial number) in the preferred form of the sequential polling scheme, each encoder may be assigned a "register select" number from a block of such numbers, e.g. one of the numbers 1-99. This register select number would be unique for an encoder with respect to all other encoders attached to the same two or three wire communications line or bus. However, the register select numbering scheme could be repeated for other groups of encoded registers which are electrically separate from each other. With this arrangement, the reader/programmer merely addresses each of the register select numbers in the assigned block of numbers (e.g. it sequences through the numbers 1, 2, 3 ... 99). When an encoder register sees its "register select" number being interrogated by the reader/programmer it "wakes up" and sends its meter reading data back to the reader/programmer. When no further data signals are emitted by the encoders, the reader/programmer assumes that all encoded registers have been read. Thus, the reader/programmer does not have to know how many encoders are attached to a single line, nor does it have to be programmed with a unique identification or serial number for each of the registers it will be reading; instead, it merely has to cycle through all possible register select numbers. Alternatively, one of the encoder registers may be assigned a special register select number which is interrogated first, prior to interrogating other registers. This initially interrogated register contains data bits indicative of the number of registers connected to the particular communications line or bus. This information is used by the reader/programmer to determine how many register select numbers to cycle through, so that no time is wasted interrogating register select numbers which are not used by a particular group of registers.

Each encoder may include a non-volatile memory for storing various types of data including data indicative of one or more characteristics of the utility meter with which it is associated. This data could include a meter serial number, register select number, meter type, and data indicative of the presence of a further meter register. The data indicative of the presence of a further meter register is used in the case where two meter registers are to be read in tandem with each other. For example, some types of water meters known as compound meters include a first register and metering mechanism for measuring the consumption of water at relatively low flow rates and a second register and metering mechanism for measuring the flow of water at relatively high flow rates. With the arrangement of the present invention, the memory associated with the first encoded register of the compound meter can include data bits indicative of the presence of the second register of the compound meter so that when the first register is interrogated by the reader/programmer, the reader/programmer is alerted to the fact that there is a second register to be read, thus causing the reader/programmer to read the second register after reading the first register.

Preferably, the non-volatile memory of the encoder is an EEPROM and may be reprogrammed through the use of a special reprogramming mode signal having an initial frequency or other characteristic different from that of the interrogate signal to indicate that the memory is to be reprogrammed. The format, data length and type of data thus may be easily reprogrammed by means of the reader/programmer. In a preferred embodiment, the encoder is solely powered by power supplied by the reader/programmer so that no batteries or other source of electrical power is necessary to operate the encoder.

Register select and other types of interrogation data and reprogramming data are transmitted from the remote reader/programmer or MIU through the use of a special data encoding scheme. In particular, the pulses or other time-varying signals generated by the remote reader/programmer or MIU, which constitute the interrogate signal, are periodically interrupted so as to vary the number of pulses emitted by the pulse generator in accordance with the interrogation or reprogramming data.

Additional features of the present invention include checking the position of at least one display wheel associated with the encoded register at least twice to ensure the generated data signal is accurately indicative of the actual position of the register display wheel, and comparing the first and second readings of the register display wheel and generating an error indication after one or more attempts if the readings do not match. The reader/programmer may further include an I/O port or modem for communicating with a external general purpose programmable data processor, such as a so-called personal computer, over a multi-wire cable or over a telephone line. This enables transfer of the meter reading data to the data processor and/or the programming of the reader/programmer by the data processor. Programming information may include information indicative of meter locations, route information, meter serial number and type, and previous meter reading.

In either the two-wire or three-wire modes, the reader/programmer may be a meter interface unit (MIU)

which is permanently, electrically coupled to these lines and, hence, its associated encoded meter registers. Alternatively, the reader/programmer may be portable and powered by a battery. The reader/programmer would then include a connector for temporarily mating with a communications port connected to the two-wire or three-wire lines to enable communication between the reader/programmer and the encoder.

The encoder may further include circuitry for counting pulses generated from a pulse generator-type meter register or switch closures caused by movement of the meter or register mechanism. Such type of registers, instead of generating an encoded representation of the meter register reading, generate an electrical pulse or cause a switch closure upon the measurement of a predetermined quantity of the commodity being measured by the utility meter. These pulses or switch closures may be accumulated in a mechanical totalizer or in an electronic shift register, or the like. The quantity of pulses or switch closures accumulated over time is indicative of the quantity of the measured commodity which has been consumed, while the frequency of the pulses or switch closures is indicative of the instantaneous consumption rate of the commodity, i.e. water consumption in gallons per minute, gas consumption in cubic feet per minute or electrical power in kilowatts. The pulse or switch closure information is transmitted to the reader/programmer in response to an interrogate signal. If the reader/programmer interrogates the encoder twice, the difference between the first and second readings may be compared and, using the elapsed time between the first and second interrogations, the rate of change of the quantity of the commodity being measured by the utility meter can be calculated. This is useful, for example, to determine if there is a gas or water leak at a customer's premises and to check that the meter and encoder are operating properly and have not been tampered with.

BRIEF DESCRIPTION OF THE DRAWING FIGURES

These and other features and advantages of the present invention will be more clearly understood from the following detailed description of the preferred embodiments, when read in conjunction with the accompanying drawing figures wherein.

Figure 2:
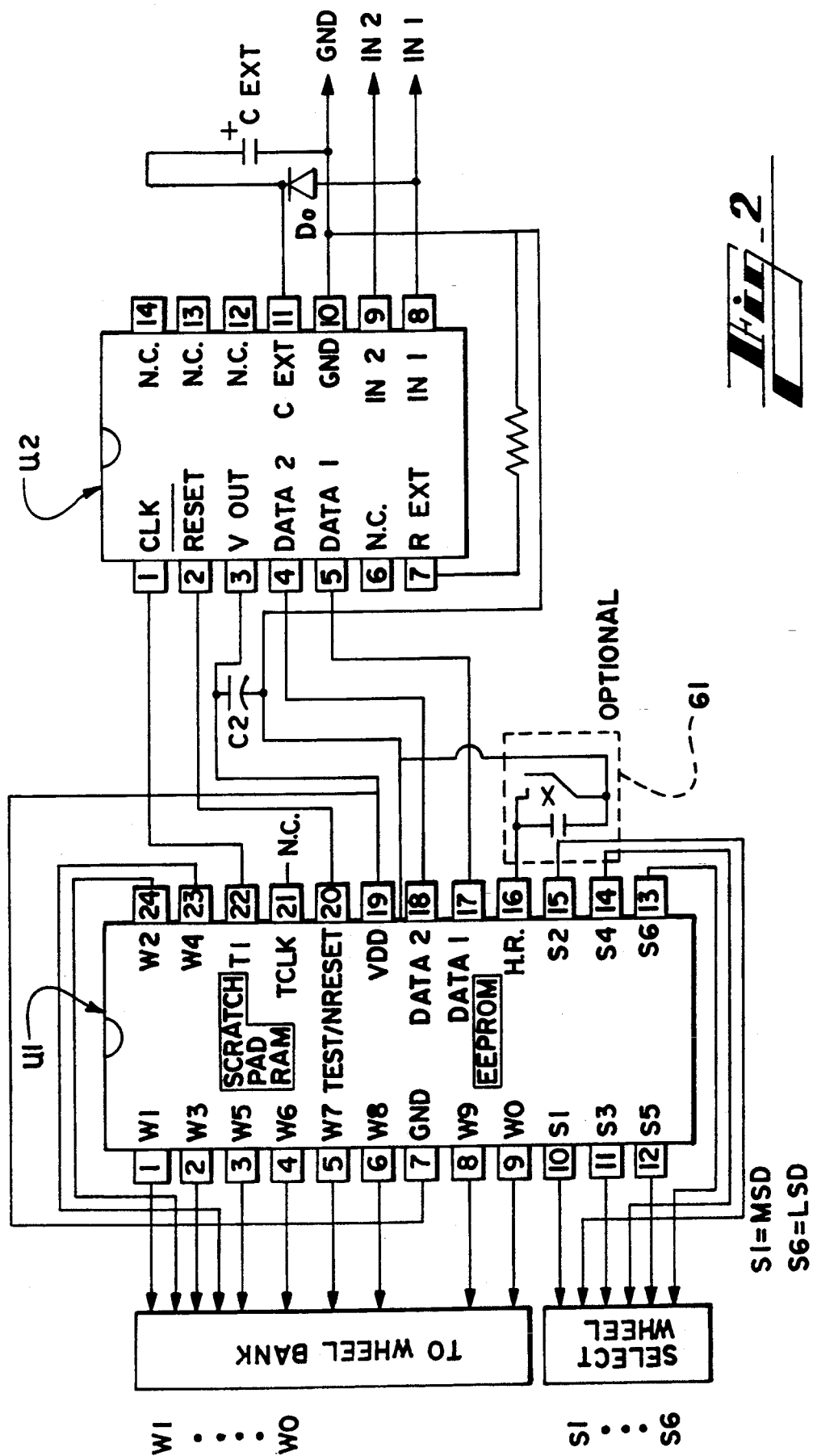
FIG. 2 is a schematic diagram showing the circuitry for encoding the meter registers of FIG. 1.
Figure 3:
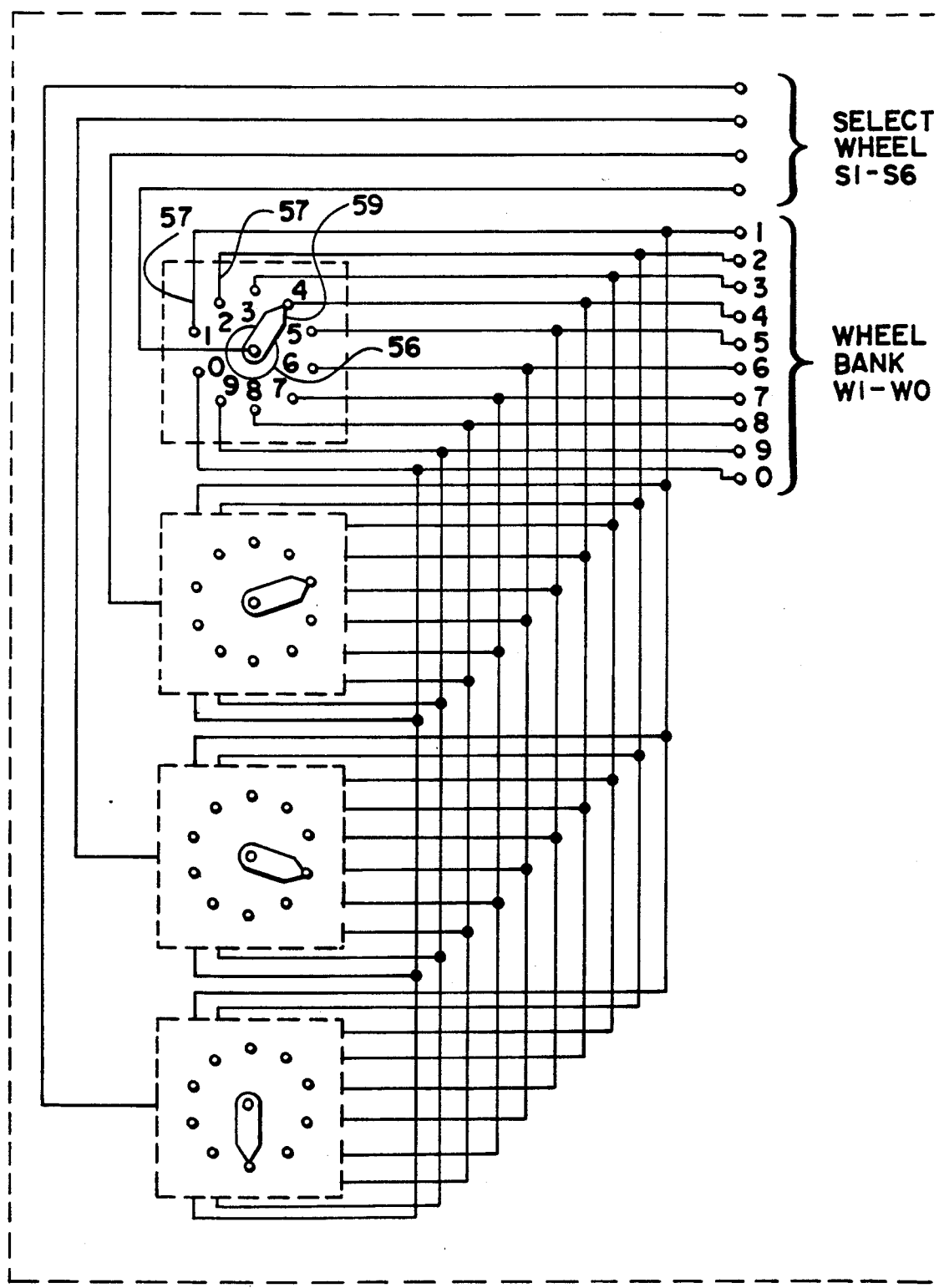
Figure 4:
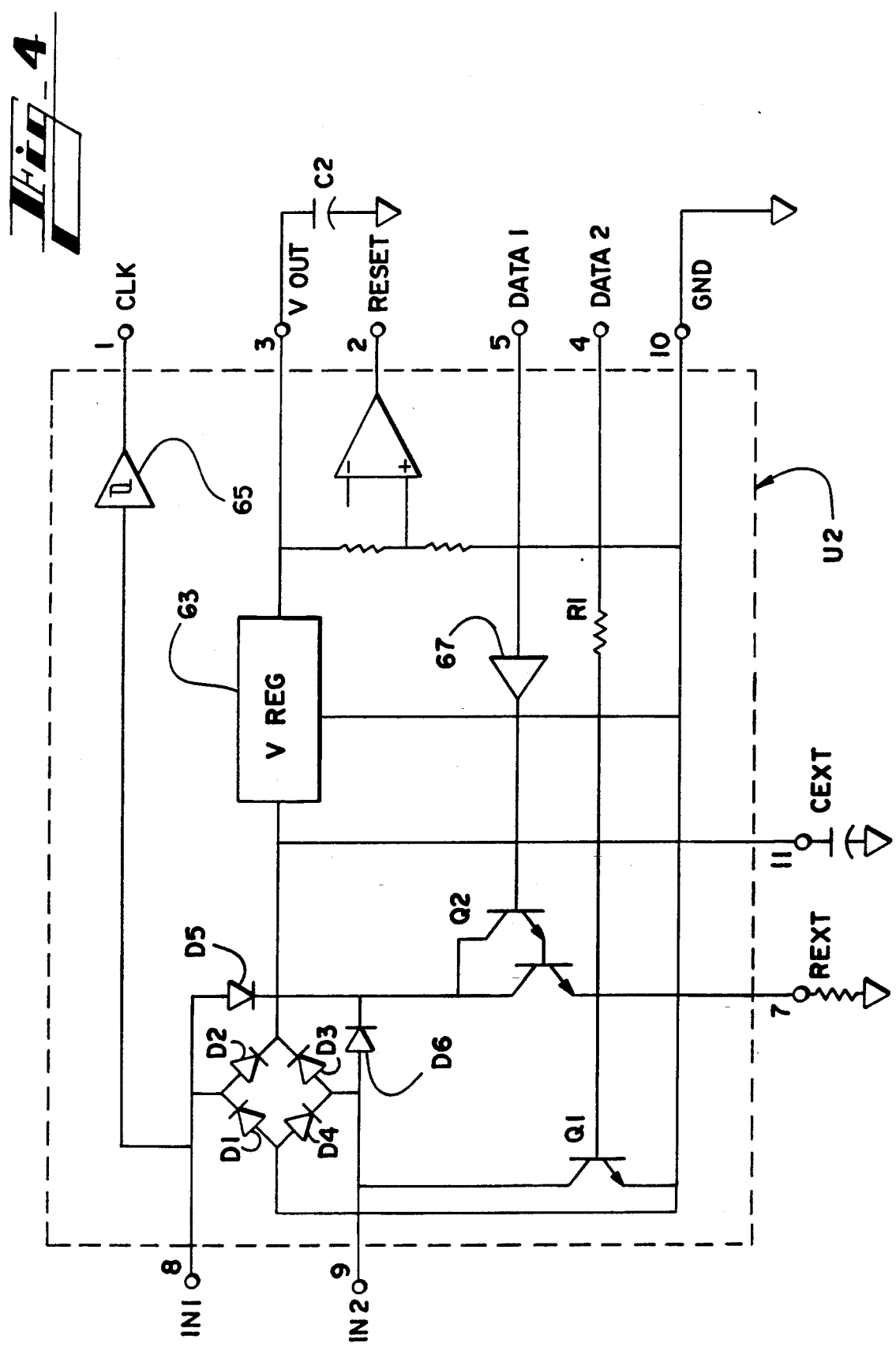

FIG. 3 schematically shows the arrangement of the meter dial encoding mechanism used with the present invention;

FIG. 4 is a more detailed schematic of the interface circuitry which forms part of the encoder circuitry shown in FIG. 2;

FIG. 5 is a diagram showing the relationship of the reader/programmer clock signal and biphase data signal of the encoder circuitry of FIG. 2;

FIG. 6 is a diagram showing the relationship of the reader/programmer clock signal and its demodulated data signal;

FIG. 7 is a diagram illustrating the pulse-length data encoding scheme employed by the present invention;

FIG. 8 is a schematic diagram showing the general components making up the reader/programmer of the present invention;

FIGS. 9A and 9B are a more detailed schematic diagram of the two wire I/O circuitry shown in FIG. 8;

FIG. 10 is a side plan view showing the two wire inductive probe/adaptor and port as used with the present invention; and FIGS. 11A and 11B are a more detailed schematic diagram of additional circuitry comprising the reader/programmer shown in FIG. 8.

DETAILED DESCRIPTION OF THE PREFERRED EMBODIMENTS

Figure 1:
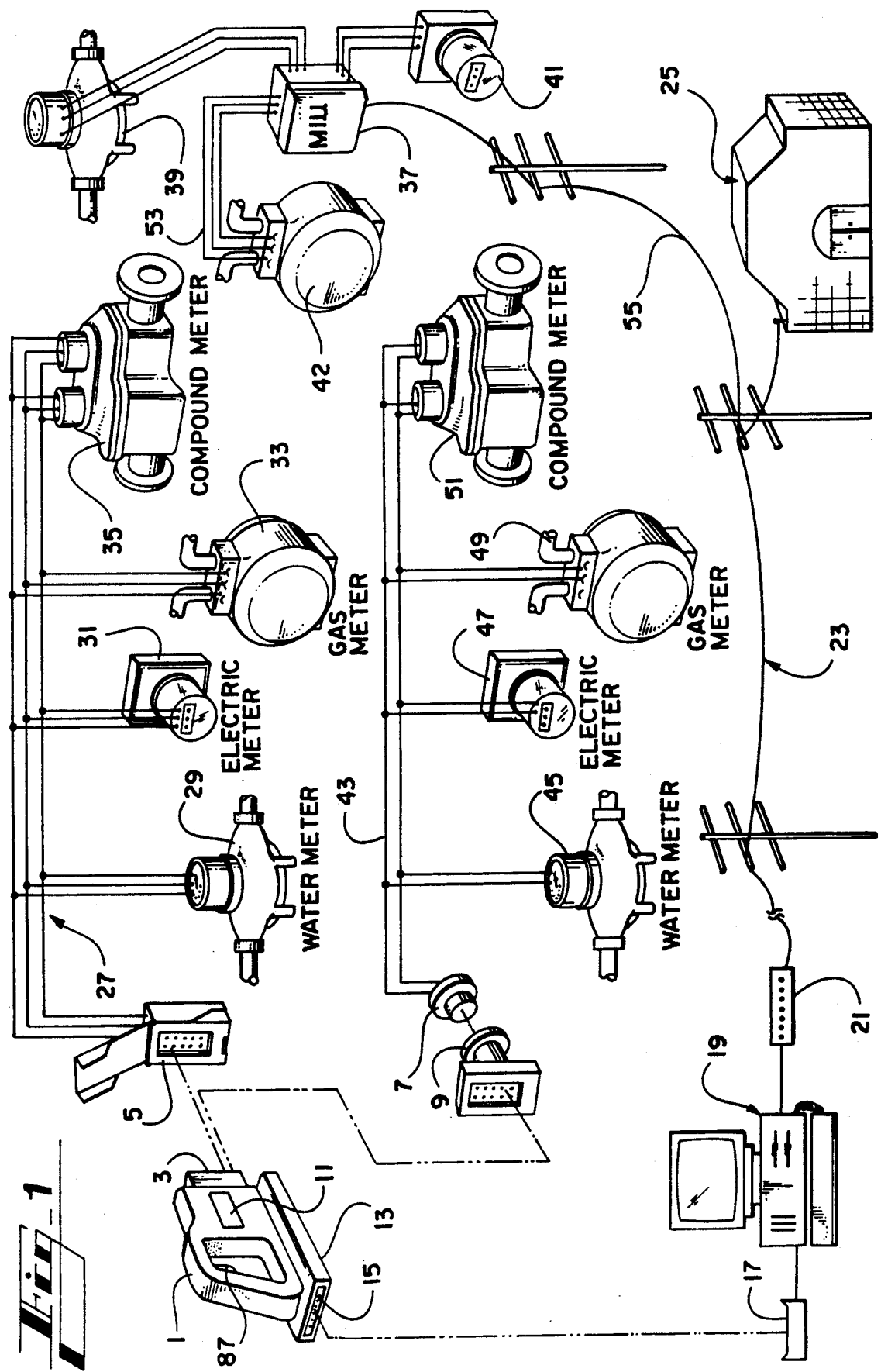
FIG. 1 shows the general configuration of a two and three wire utility data communication system constructed in accordance with the principles of the present invention.

FIG. 1 shows the general configuration of a two and three wire utility data communication system constructed in accordance with the principles of the present invention. The system comprises a reader/programmer 1 having a connector 3 which is adapted to be connected directly to a three wire receptacle 5 or a two wire port 7 (when used with adaptor 9 disposed between connector 3 and port 7).

Reader/programmer 1 includes a display 11 and a rechargeable battery pack or power source 13. Reader/programmer 1 may further include a data storage memory, a microprocessor and innput/output circuits as described in more detail below with respect to FIG. 8. Reader/programmer 1 may further include a recharging and data transfer connector 15 which is adapted to mate with a recharging cradle/data transfer unit 17, as shown in FIG. 1. Recharger/data transfer cradle 17 is connected to a computer 19, such as an IBM TM compatible personal computer, or the like, via a standard RS232 serial interface. The computer 19 may further include an internal or external modem 21 for transferring data over telephone lines 23 back to a utility's home office 25 for billing or load survey purposes.

Reader/programmer 1 is designed to be portable and to be carried around by a meter reader as he makes his rounds to read meters along a predesignated route. As it is well known in the art, reader/programmer 1 may be preprogrammed, preferably when connected to computer 19 via recharger/data transfer unit 17, to load routing information into a memory contained within reader/programmer 1. This routing information, which may be called up by the meter reader is displayed on display 11. This routing information tells the meter reader where the next meter to be read is located, and may also indicate the meter type (e.g. water, gas or electric), the meter serial number, and the last meter reading for that particular location.

Currently, there are two generally incompatible types of remote meter reading systems in operation. In type, as exemplified in U.S. Pat. No. 4,085,287, an encoder is associated with the meter register with the encoder having a series of conductive pads and a moveable contact associated with one or more odometer-type register display wheels. The position of the moveable contact with respect to the conductive pads indicates the register wheel position and hence the quantity being displayed by the meter register. Upon interrogation by a portable reader/programmer, the registered position information is transmitted via three or fourteen conductive wires to the reader/programmer. Data is transmitted from the encoder to the remote reader.

A second type of system utilizes an encoded meter register connected to a two wire port which, in turn, is inductively coupled to a portable meter reading device.

Such a system is shown in U.S. Pat. Nos. 4,782,341, 4,758,836, 4,652,877 and 4,463,354. In this type of system, a portable meter reading unit is provided with an inductive loop or coil which mates with a similar loop or coil arranged on a receptacle. The receptacle is coupled via two lines to an encoded meter register. The coil of the reading unit is brought into proximity with the coil of the receptacle and an AC interrogation signal is applied to the coil connected to the meter. This AC signal is transmitted to the remote meter register by means of the inductive coupling between the two coils. This interrogation signal is used to "wake up" the encoded meter register which sends back the meter reading data by modulating an AC carrier signal. The AC carrier signal can be generated internally by the meter encoder or may be the interrogation signal itself.

The present invention enables a portable reader/programmer 1, such as shown in FIG. 1, to interrogate and read encoded water, gas, and electric meters over both three wire direct, electrical connections and two wire inductively coupled connections. The system is also designed to be self-powered, that is to be powered solely by the power source 13 contained by the portable reader/programmer 1. The system is also designed to remotely read more than one encoded meter register at a time, so that multiple encoded registers may be connected to a common two or three wire bus.

Again referring to FIG. 1, when in the three wire mode, connector 3 of reader/programmer 1 is inserted into wired receptacle 5. Receptacle 5 is connected via a three wire bus 27 to encoded water meter 29, encoded electric meter 31, encoded gas meter 33, and encoded compound meter 35. Each of meters 29, 31, 33 and 35 incorporate an encoded register mechanism described more fully below with respect to FIGS. 2, 3, and 4.

Each of these encoded registers is responsive to interrogation signals generated by reader/programmer 1 to transmit back via bus 27 their register readings.

In the two wire mode, the interrogation signal generated by reader/programmer 1 is transmitted via adaptor 9, which includes an inductive loop or coil (shown in more detail in FIG. 10) which, when placed in proximity to port 7 induces an interrogation signal over two wire bus 43. Inductive port 7 includes a complementary loop or coil to complete the inductive coupling with adaptor 9. Connected to two wire bus 43 are encoded water meter 45, encoded electric meter 47, encoded gas meter 49 and encoded compound meter 51. Each of these meters includes an encoded meter register whose characteristics and circuitry are described in more detail below with respect to FIGS. 2, 3, and 4.

It should be understood that the number and types of meters and registers shown in FIG. 1 are merely illustrative. Additional meters and registers of other types can be easily accommodated by the present invention. Of particular note with respect to FIG. 1 is the ability of reader/programmer 1 to read multiple remote encoded registers over a single two or three wire bus. This capability also enables reader/programmer 1 to read socalled "compound" meters, such as compound meters 35 and 51. A compound meter is a type of water meter which has a first register associated with a low flow measuring element and a second register associated with a high flow measuring element. Both registers must be read in order to obtain an accurate reading of water consumption.

Another advantage of the present invention is that the encoded registers, which are described in more detail below, can be used or interchanged with existing two or three wire remote meter reading equipment. This means that a customer does not have to concerned about making a choice between either a two or three-wire system and can select whichever one is suitable for his purposes while maintaining compatibility. Reader/programmer 1 is specifically designed to be able to read encoded registers in either a two wire or a three wire system.

As shown in FIG. 1, a meter interface unit (MIU) 37 may also be connected over a three wire bus 53 to encoded meter registers of the type described below with respect to FIGS. 2, 3, and 4. MIU 37 preferably of the type as shown in U.S. Pat. No. 4,852,152. As described in the aforementioned patent, MIU 37 may include up to four data ports for connection to up to four encoded registers or other data generating devices. For simplicity, FIG. 1 shows an additional encoded water meter 39, encoded electric meter 41, and encoded gas meter 42 connected to the inputs of MIU 37 over three wire lines 53. As described in the aforementioned patent, MIU 37 periodically interrogates encoded registers associated with meters 39 and 41 and stores signals indicative of the measured quantities in a memory provided in MIU 37. The data stored in the memory in MIU 37 is responsive to an interrogation signal initiated at the utility home office 25 or by personal computer 19 to send the register readings from meters 39, 41, and 42 stored in the memory of MIU 37 over phone lines 55 or 23 to utility office 25 or computer 19.

Thus, data indicative of the quantity of a commodity being measured by meters 39, 41, or 42 may be transmitted back to a utility's central office 25 or to a computer 19. Advantageously, the encoder of the present invention is directly usable with conventional meter interface units of the type described in U.S. Pat. No. 4,852,152 which require a three wire metallic connection, while also offering the possibility of being remotely read by means of a portable reader/programmer in either a two or three wire mode. FIG. 2 shows the electronic components comprising an encoder register. FIG. 3 shows how these components are connected to one or more odometer-type register wheels 56. A series of conductive pads 57 and a moveable contact 59 are associated with each wheel of the odometer-type display. See U.S. Pat. No. 4,085,287 and U.S. Pat. application Ser. No. 433,864, filed Nov. 9, 1989 for a more complete description of the mechanical aspects of the odometer-type wheel encoding mechanism. Although only four register wheels are shown schematically in FIG. 3, it is to be understood that the encoder arrangement shown in FIG. 2 can be easily adapted to handle any number of register wheels or display positions.

Again referring to FIG. 2, a microprocessor unit U1 has a number of switched inputs (typically ten in number) labelled W1, W2 ... W0, which are connected to the corresponding conductive pads 57 associated with each odometer display wheel, as shown schematically in FIG. 3. Microprocessor unit U1 further includes a series of switched outputs, S1, S2 ... S6 which are connected to corresponding moveable contacts 59 associated with each register display wheel. As described in more detail below, when microprocessor unit U1 is commanded to do so, wheel select outputs S1–S6 are sequentially strobed and any switch closures detected through switch inputs W1, W2 ... W0, which are indicative of the position of a particular register display wheel, are noted by microprocessor unit U1.

Microprocessor unit U1 preferably is of the S6 family manufactured by SGS Thompson. Microprocessor unit U1 includes approximately 32 bytes of electrically erasable programmable read only memory (EEPROM) which can contain data characterizing the particular encoder register with which it is associated.

Microprocessor unit U1 includes an optional switched input 61. Switched input 61, for example, is a reed switch placed in proximity to the driving magnet associated with a water meter or the like. As the measuring element of the water meter rotates, the driving magnet will periodically move past the reed switch, causing it to close. This closure is detected by switched input 61 for use in measuring flow rates or instantaneous consumption, as described in more detail below.

Microprocessor unit U1 is connected to an interface unit U2 as shown in FIG. 2. Interface unit U2 includes a voltage regulator, modulator and interface circuitry. Interface unit U2 is derived from the bipolar family manufactured by SGS Thompson.

The internal circuitry of interface unit U2 is shown in more detail in FIG. 4. Power for interface unit U2 and microprocessor unit U1 is derived from an external source, e.g. interrogation signals applied by reader/programmer 1 or MIU 37 (see FIG. 1) to inputs IN1 and IN2 of interface unit U2. An interrogation signal (or programming signal as described below) applied to inputs IN1 and IN2 is used to power interface unit U2 and microprocessor unit U1 via a power supply bridge composed of diodes D1–D4 and voltage regulator 63. The combination of diode bridge D1–D4 and voltage regulator 63 produces a regulated output voltage, $V_{out}$, of approximately 4.45 volts which is applied from pin 3 of interface unit U2 to pin 19 of microprocessor unit U1. A power supply filter capacitor C2 is tied between $V_{out}$ and ground GND as shown in FIG. 2. A further power supply filter capacitor $C_{ext}$ is connected between ground GND and pin 11 of interface U2 which is connected to the input of voltage regulator 63. These power supply circuit elements help to keep $V_{out}$ steady at approximately 4.45 volts even though voltages induced by interrogation or programming signals applied to IN1 and IN2 may swing from approximately 4.75 volts to 20 volts.

An important feature of the present invention is that interface unit U2 contains circuitry to modulate the amount of current consumed by the encoded register when in the two wire mode and an interface circuit which has an open collector for producing an output data signal when in the three wire mode. In the two wire mode an interrogation signal has a frequency of approximately 19.2 kHz. A portion of this signal is rectified by diode bridge D1–D4 and used to power microprocessor unit U1, as described above. U2 includes a reset circuit which detects $V_{out}$ and will hold the microprocessor in a reset mode until $V_{out}$ has gone to a level which will guarantee that the microprocessor will operate properly. This prevents any false resets of the microprocessor or erroneous data from being output because of a lack of proper power. A Schmidt trigger 65 is also connected to input IN1. Schmidt trigger 65 is used to clean up the clock signal which supplies the clocking from the microprocessor so that the circuit can operate in a synchronous mode where the output rate is determined by the input clock signal. Transistor Q1 has its collector tied to input IN2, its emitter tied to ground and its base tied, via current limiting resistor R1, to data line DATA2 connected to microprocessor U2. When in the three wire mode, input IN2 looks like an open collector to the circuit and during reading a resistor in the reader/programmer would act to pull-up the signal level for Q1 appearing at IN2. In the three wire mode, input IN1 would supply the clock signal.

In the two wire mode, interrogation or programming signals applied to IN1 and IN2 which are connected to diodes D5 and D6, respectively, which in turn are tied to the collectors of a transistor pair Q2. The emitters of transistor pair Q2 are tied to ground through an external resistor Rext. The base of one of the transistor pair Q2 is connected via buffer 67 to data line DATA1 connected to microprocessor U1. The value of Rext determines the amount of additional current drawn, i.e. the amount of modulation when in the two wire mode.

In particular, when transistor pair Q2 is turned on, this creates additional current draw over the amount of current that is normally drawn by the encoder circuitry when Q2 is off. This difference becomes the amount of current modulation which is seen at inputs IN1 and IN2. Therefore, the only significant current change would be going through Rext. This amount of current change is not affected by swings in input voltage applied to inputs IN1 or IN2.

In the interrogation mode, a 19.2 kHz square wave signal is applied across inputs IN1 and IN2 of interface unit U2. This interrogation signal may be generated by reader/programmer 1 or MIU 37, as shown in FIG. 1. As described previously, this interrogation signal is used to supply power to microprocessor unit U1 which then "wakes up", checks the status of wheel bank inputs W1–W0 by strobing select wheel lines S1–S6. This wheel position information, which is indicative of the reading displayed by a particular odometer-type wheel, is then formatted and output by microprocessor unit U1 as a synchronous series of biphase logic signals, as shown in FIG. 5. For example, a logical "1" is indicated by no phase or state transition during 16 input clock cycles. A logical "0" is indicated by a transition occurring sometime during a sustained clock cycle. The phase or state transition shown in FIG. 5 is indicative of a change in the impedance displayed across inputs IN1 and IN2 due to the action of transistor Q2 and the current modulation reference resistor Rext. Therefore, the biphase current modulation scheme as used in the two wire implementation of the present invention causes the amount of current being drawn by interface unit U2 to remain constant over 16 clock cycles to indicate that a logical one is being transmitted. The amount of current being drawn at inputs IN1 and IN2 will appear steady during a 16 clock cycle period.

If a logical "0" is being transmitted, the current being drawn at inputs IN1 and IN2 will appear to change during a 16 clock cycle period. Thus, if the current level changes every 16 clock cycles, this equates to a logical 1 being transmitted; if the current level changes every 8 clock cycles, this is indicative of a transmission of a logical 0.

In practice, the "low" modulation level is approximately 1 milliamp and the "high" level is 3 milliamps. The bi-phase encoded data is transmitted from inputs IN1 and IN2 back along the two wire bus 43 typically in a standard ASCII format as shown in FIG. 6. This format typically includes a start bit, 7 bits of data, with the least significant bit being transmitted first, a parity bit followed by two stop bits. Once a set of data has been transmitted, if the clock signals are still present, register wheel position information will be read again by microprocessor unit U1 and output again. This will be repeated as long as the clock signal is applied to inputs IN1 and IN2.

Each time that the data is clocked out of microprocessor unit U1, the status of the reed switch 61 is checked to see if the switch has opened and closed. If it has, it will increment a single digit counter in microprocessor unit U1 which can be included in the output data stream to show that flow through a meter, such as water meter 45, is occurring. If no flow is occurring, this flow status data bit will remain a 0.

In the three wire interrogation mode, a clock signal having a frequency of, for example, 2400 Hz is applied between IN1 and ground. As in the two wire mode, power for interface unit U2 and microprocessor unit U1 is derived from the clock signal. Register wheel position data is gathered by microprocessor unit U1 and is output synchronously with the clock signal as an ASCII data stream through the action of transistor Q1 which appears as an open collector output. The ASCII data format is the same as in the two wire mode, shown in FIG. 6.

Since this is a synchronous mode, as is the two wire version previously described, the speed with which data is output at terminal IN2 is determined by the input clock frequency. Normally, this is a one-to-one ratio. However, it is possible to have data bits clocked out only after a predetermined number of clock cycles have occurred. Thus, if a divide by 16 relationship were used, one data bit would be output at terminal IN2 for every 16 clock cycles input at terminal IN1. This division ratio is programmable within microprocessor U1.

The EEPROM which is part of microprocessor unit U1 may be programmed as described in more detail below to contain data indicative of the characteristics of the encoded register with which it is associated. This characterization data may include, among other things, a meter ID number or serial number, a "register select" number (described in more detail below), an ID or character indicative of the manufacturer of the meter, a character indicative of the type of meter, e.g. gas, water, or electric, a character indicative of whether the meter is to transmit in a two wire or three wire mode, and data indicative of the presence of a further meter register. The data indicative of the presence of a further meter register is used in the case where two meter registers are to be read in tandem with each other, such as is the case with compound water meters. This data will then indicate to a reader/programmer the presence of the second register of the compound meter so that when the first register is interrogated by a reader/programmer, such as reader/programmer 1 shown in FIG. 1, the reader/programmer is alerted to the fact that there is a second register to be read, thus causing the reader/programmer to read the second register after reading the first register. All of the data stored in the EEPROM contained in microprocessor unit U1 may be altered through the use of a suitable external programming signal, as described in more detail below.

An important aspect of the present invention is the capability of the meter reading system to read multiple encoded meter registers connected along a common two wire or three wire bus. In a conventional polling scheme, reader/programmer 1 or MIU 37 would have stored within their respective memories a listing of meter ID or serial number of every meter connected to the network. When connected to the appropriate two wire or three wire network reader/programmer 1 would sequentially poll the meter IDs or serial numbers contained in its memory until all encoded meter registers on the network having those IDs or serial numbers had responded back. However, there is a practical limit to this scheme in that reader/programmer 1 must contain a listing of all possible encoded registers which may be accessed on a particular route. In reality, economic and electrical considerations dictate that the number of encoded meter registers which can be connected to a single two wire or three wire network is limited. Therefore, sequentially polling through a listing of hundreds, if not thousands of meter serial numbers and IDs which may be contained in the memory of reader/programmer 1 may only result in a small percentage of valid meter ID or serial number matches for a particular local two wire or three wire network.

This limitation is overcome by the present invention in which the "register select" data or number for each encoded register within a particular local network is unique. For example, a local network could have the first register set with a register select number of "00", the second register set as "01", the third as "02" and so forth. This means that meter/programmer 1 does not have to know the meter serial or ID number of the meter registers connected to a particular network. Reader/programmer 1 need only cycle through all the register select numbers for the network having the largest number of registers within a system. Thus, if the largest local network had 100 meters tied to a single two wire or three wire local network, reader/programmer 1 would only have to cycle through register select numbers 00-99 in order to ensure that all encoded registers within that particular network were read. In addition, it is possible to program one of the encoded registers so that the EEPROM contained within microprocessor U1 of that particular register contains data indicative of the number of registers attached to that particular network or, alternatively the highest "register select" number of a register connected to that network. This special encoded register may be assigned a unique or readily identifiable register select number such as "00" or "99". Reader/programmer 1 is then programmed to automatically check for this unique register select number. As part of the data stream coming back from this encoded register, the reader/programmer is then informed of the total number or highest register select number of the encoded registers connected to the local network.

This arrangement enables reader/programmer 1 to rapidly and completely poll all encoded registers, and only those registers, connected to a particular local network without the waste of time of polling through unused register select numbers.

The register select number is transmitted from reader/programmer 1 over two wire network 43 or three wire network 27 as an eight bit number (two hexadecimal characters). The register select data is encoded by a type of pulse-length encoding in which 1s and 0s are indicated by periodically interrupting the clock signal (CLK) transmitted from reader/programmer 1. For example, the clock signal (CLK) may be interrupted for approximately 1 millisecond every so many clock cycles. In the scheme employed by the present invention, and illustrated in FIG. 7, if the number of clock cycles between interruptions is less than 106, microprocessor unit U1 of the encoded register will interpret this as a logical "0". If the number of clock cycles is greater than 106 but less than 138 between interruptions, microprocessor unit U1 interprets this as a logical "1". If the number of clock cycles between interruptions is greater than 138, microprocessor unit U1 interprets this as a reset period, that is, a buffer area within microprocessor U1 which is looking for the incoming register select data bits is automatically reset if there is more than 138 clock cycles between interruptions.

An important result of this feature is that once a register "sees" its register select number, then data contained in the EEPROM and a scratch pad memory contained within microprocessor U1 will be clocked out, as described above, along the associated two wire bus 43 or three wire bus 27. Since clocking out of register data will take considerably more than 138 clock cycles, this means that every other register which is attached to the same common bus or local network will be automatically reset whenever a particular register responds to its register select number and outputs data. This ensures that all registers connected to a particular local network will be automatically resynchronized to the interrogation (clock) signals and obviates the need for start and stop bit characters to be appended to the two hexadecimal characters being transmitted by the reader/programmer indicative of the desired register select number.

In the preferred embodiment of the invention the pulse-length encoding scheme, as represented by FIG. 7, utilizes one millisecond gaps in the 19.2 kHz interrogation or data signal to indicate separations between data bits. A logical "1" is represented by a 7 millisecond pulse train of the 19.2 kHz clock burst. A logical "0" is represented by a 4 millisecond pulse train of the 19.2 kHz clock. Data in the program or query modes is sent using even parity ASCII.

As previously mentioned, an important feature of the present invention is the ability to reprogram the EEPROM contained in the microprocessor unit U1. In the "program" mode, the contents of the EEPROM may be overwritten or changed. In the "query" mode, the contents of the EEPROM may be read out but not changed. The program mode gives a customer the ability to customize the characteristics identified with a particular encoded register. The query mode allows the customer to check the contents of the EEPROM to ensure that the contents of the EEPROM have been properly written.

In order to place the encoded register into to the query or program mode, reader/programmer 1 generates a special 38.4 kHz interrogation signal. This signal is exactly twice the frequency of the normal interrogation signal frequency of 19.2 kHz. This special query/program signal lasts for a minimum of 50 milliseconds. Microprocessor unit U1 of the encoded register is programmed having a timing loop which detects the frequency of the incoming clock signal. If the frequency is 19.2 kHz, the microprocessor assumes the normal interrogation mode, reads the position of the various register display wheels, and reports back to the reader/programmer 1 as previously described. If the microprocessor unit U1 detects the 38.4 kHz query/program mode interrogation signal, it will then enter into the query/program mode. Microprocessor unit U1 then looks for a unique ASCII character transmitted by reader/programmer 1. Reader/programmer 1 sends a Q in order to query the contents of the EEPROM over a two wire network. A q is sent by reader/programmer 1 in order to query the contents of the EEPROM over a three wire network. Upon receipt of either the Q or q character, microprocessor unit U1 then transmits out the contents of the EEPROM as even parity ASCII data.

To place the EEPROM in the "program" mode, a P is sent by reader/programmer 1 when used in conjunction with a two wire network, and a p is sent when used in conjunction with a three wire network. In either of the two wire or three wire modes, immediately following the program mode character, P or p, 32 data bytes of program information is sent to microprocessor unit U1. Since microprocessor unit U1 has been placed in the programming mode, it then allows the contents of the EEPROM to be overwritten with this new program data. Once this data is written into the EEPROM of microprocessor unit U1, microprocessor unit U1 immediately reads out the new contents of the EEPROM, as if it were in the query mode, back to reader/programmer 1 for confirmation of the data programmed into the EEPROM.

Upon the completion of either a query or program mode interrogation of the encoded register, the microprocessor unit U1 automatically reverts back to its normal interrogation mode. In this mode, data from the encoded register is transmitted back as 23 to 34 bytes of data depending upon the meter reading and ID sizes. A typical data message format is shown in the following Table 1:

TABLE 1

| Standard ARB VI Data Format | | |
|---|---|---|
| Number of Bytes | Data Byte | Description |
| 1 | STX | — |
| 1 | 1 | Data Format Code |
| 2 | 0–9 | Network ID, High Byte |
| — | 0–9 | Network ID, Low Byte |
| 1 | S | Manufacturer (e.g. Schlumberger) |
| 1 | W | Type of meter (e.g. Water) |
| 1 | ETB | — |
| 4 to 6 | Alphanumeric | Meter Reading |
| 1 | ETB | — |
| 1 to 10 | Numeric | ID Number |
| 1 | ETB | — |
| 1 | 0–9 | Flow Character |
| 1 | ETB | — |
| 1 | Alphanumeric | User Character 1 |
| 1 | Alphanumeric | User Character 2 |
| 1 | Alphanumeric | User Character 3 |
| 1 | ETB | — |
| 2 | Alphanumeric | Checksum |
| 1 | EXT | — |

The message begins with an STX character (data blocks are separated by ETB characters), and the message ends with an ETX character. The flow character can be a character from 0–9. In case the flow rate function is not implemented, this character will be a space. The three "user characters" do not affect the operation of the register but allows the end customer to put in identifying characters or information in the register. The two character checksum is normally the summation of all the data characters contained in the data message, excluding the STX and ETX characters. However, if desirable, in the program mode a checksum character may be sent to the EEPROM contained as part of microprocessor unit U1 which will also identify which characters in the data message are derived from the contents of the EEPROM itself and the meter reading. Microprocessor unit U1 will then add the flow data, (if implemented) and meter reading to this checksum character. This saves on the time it takes microprocessor unit U1 to process the information since it only has to add the additional flow and meter reading data to the already existing checksum and not do a total recalculation of the checksum. In addition, it provides backup verification that the information contained in the EEPROM of microprocessor unit U1 has not been altered. If such alteration should occur, either accidentally or deliberately, the checksum would be incorrect and an error message would be transmitted back to reader/programmer 1. As previously described, in the interrogation mode a 19.2 kHz interrogation (clock) signal is generated by reader/programmer 1 and sent over the two wire or three wire network to an encoded register. Power is derived from this interrogation signal by interface unit U2 of the encoded register and used to "wake up" microprocessor unit U1. Microprocessor unit U1 times the interrogation clock pulses to confirm that a true interrogation signal is present, not noise or other transients. Microprocessor unit U1 then strobes select wheel lines S1-S6 and detects the presence of signals along wheel bank lines W1-W0. This information is then stored in a temporary scratch pad memory contained in microprocessor unit U1. This same interrogation process is repeated a second time with the second register display wheel reading being compared with the first reading already stored in memory. If there is an exact match, then the register position display reading will then be output, along with the other register characteristic data contained in the EEPROM, back to reader/programmer 1. If the two readings do not match, microprocessor unit U1 will reread the positions of the register display wheel up to five times and compare the current reading with the just preceding reading until a validated match is found. If no match occurs after five readings, microprocessor unit U1 will fill the meter reading data field (see Table 1) with the character X, instead of the numeric characters 0-9. In addition, microprocessor unit U1 looks for shorted and open contacts, e.g. a short between conductive pads 57 (see FIG. 3) or where contact 59 is between conductive pads 57. In this latter case of an open circuit, a dash (-) is placed in the appropriate place in the meter reading data field. In the case of a "short", an "H" will be placed in the appropriate position in the meter reading data field. These error indications are then transmitted back to reader/programmer 1.

For flow and leak detection, the status of reed switch 61 is monitored any time microprocessor unit U1 is powered up. The status of reed switch 61 is affected by the rotation of the magnetic drive coupling magnet which is part of a standard water flow meter. The rotation of the magnet, and hence the opening and closing of reed switch 61, represents the flow of fluid through the meter.

The rate of magnet rotation, and hence the number of openings and closings of reed switch 61 per unit time, represents the rate of flow.

In the flow/leak detection mode, the status of reed switch 61 is monitored to determine whether an opening or closing of reed switch 61 has occurred. Thus, if the status of reed switch 61 has changed during interrogation of the encoded register, this fact will be noted by microprocessor unit U1 and the flow character which is part of the data message (see Table 1) will be output to indicate that flow is occurring. In this mode, leaks may be detected by first shutting off all normal sources of water use at a premises (e.g. washing machines, dishwashers, sinks, and tubs). The encoded register is interrogated by reader/programmer 1 for a few seconds to see whether flow is occurring (i.e. if the status of reed switch 61 changes). Of course, the leak detection mode only informs a user that flow is occurring, but gives no information about the rate of flow.

In order to determine the rate of flow, the reed switch 61 is monitored for several seconds, or a longer period if desired. The number of openings and closings of reed switch 61 is counted and temporarily stored in scratch pad memory of microprocessor unit U1. The number of openings and closings over the monitoring period (whose time interval is measured by timing circuitry contained within microprocessor unit U1) is used to calculate the flow rate. This is readily done since the opening and closing of reed switch 61 indicates one-half revolution by the magnetic coupling of its associated water meter. The volume of water passing through the meter per one revolution is a known quantity. The flow rate is then simply calculated using the formula:

$$\text{Flow rate} = \frac{\text{number of reed switch closures}/x \text{ volume per one-half revolution}}{\text{measurement interval}}$$

It is also possible to program microprocessor unit U1 so that immediately after reading out the position of each of the register display wheels, microprocessor unit U1 then goes into a flow rate detection mode for a predetermined period of time. This obviates the need to separately query the encoded register to begin flow rate detection after entering the interrogation mode.

As a further feature of the invention, the flow rate detection scheme may be utilized to provide a so-called "pulser" output. In this mode, the encoded register, e.g. 39 in FIG. 1, is connected to an MIU 37. MIU 37 is either self-powered (using an internal battery), or more typically, powered by the voltage normally present on telephone lines 55. MIU 37 may then continuously or intermittently monitor the status of the flow character output by the microprocessor unit U1 associated with the encoded meter register. Since the volume of water or other available commodity per revolution of the magnetic coupling of meter 39 is a known quantity, the number of pulses received by MIU 37 from encoded meter register 39 over time is indicative of the total quantity of water or other billable commodity measured by the metering mechanism.

While the flow/leak detection and flow rate detection of the present invention has been described with respect to the use of a reed switch in combination with the magnetically coupled drive of a water meter, it is to be understood that any encoding system in which the state of a switch or other element can be detected is also suitable for use with a present invention. For example, an electricity meter may include a pulser output where rotation of the meter's eddy disk is detected by electro-optical means. Other sources of pulses or status information, such as piezoelectrically driven pulse generators, electromotive generators, or the like may be used with suitable pulse or status detection circuitry which is well known in the art. This enables the meter reading system of the present invention to be used with older remotely-readable meters which do not use an absolute encoder type of register mechanism, such as as described above and in U.S. Pat. No. 4,085,287. These pulser-type meters, while lacking the accuracy of an absolute-encoded meter register, are quite common. The pulser mode therefore enables the meter reading system of the present invention to accommodate and read these older, pulser-type meters through a simple programming change of reader/programmer 1.

As mentioned earlier, an important feature of the described meter reading system is its ability to poll or read multiple encoded meter registers connected to the same local two wire or three wire network. In this polling mode, reader/programmer 1 would send a "register select" number which, for example, could be a number between 00-99. Each encoded meter register connected to a particular local network would have previously been programmed (e.g. using the "program" mode function described above) with a register select number unique to that particular network. The encoded meter registers, in particular the microprocessor unit U1 associated with each register, is programmed to recognize its register select number, which was previously programmed and stored within the EEPROM associated with the particular microprocessor unit U1. The register, upon recognizing its register select number, would then take a reading of the register display wheels and respond with this reading, along with the other data associated with a meter reading message, as set forth in Table 1. The two bytes of information set aside for "network ID", as set forth in Table 1 are the same as the "register select number".

In a basic polling mode, the reader/programmer 1 would send out a register select number of 01, followed by 02, etc. until it had cycled through all possible register select numbers. Responses will be heard back from any encoded registers whose register select number is interrogated. In this way, reader/programmer 1 does not have to know the serial number or unique ID of a particular encoded meter register, but need only cycle through all possible register select numbers in order to ensure polling of all encoded registers on a particular network. If a two byte register select number is used, this will accommodate up to 100 encoded registers on a single local network (register select numbers 00-99). Of course, if a larger number of registers need to be accommodated, an additional byte of register select data could be set aside for this purpose. However, for several reasons, connection of more than 100 encoded registers to a single local network becomes more difficult to manage. This is because of the additional time required to poll additional encoded meter registers and because of the additional power requirements imposed upon reader/programmer 1 since reader/programmer 1 will be required to drive and supply power to each of the encoded registers over greater and greater lengths of wire. The increased resistance and impedance caused by these longer wiring runs can be compensated to a degree, as described in more detail below, but at a cost in speed and power consumption at the reader/programmer end.

The use of register select numbers allows a more sophisticated polling technique than the foregoing to be used. For example, reader/programmer 1 can be preprogrammed to always poll for register select number "99" as its first register select number. One of the encoded meter registers on a particular local network is preprogrammed to respond to this "99" register select number. This register would not respond back with the "99" register select number, but rather with a number which is equal to the number of registers attached to the particular local network. For example, if there were four registers connected to the local network, this register would reply back with a register select number of "4" which would tell the reader/programmer that there were three additional registers. These additional registers would have been previously programmed with register select numbers 01, 02 and 03. The reader/programmer 1 would then poll these three additional registers in any order. Thus, upon initially interrogating a local network, the reader/programmer 1 will immediately know how many encoded meter registers are connected to that particular network and will not waste time cycling through register select numbers which are not present on the network.

In the case of a compound water meter 35 or 51 (FIG. 1), the first encoded register of the compound meter can be assigned a unique register select number, e.g. "99". This would tell reader/programmer 1 that the meter is a compound meter and to look for a reading from the second encoded register associated with the compound meter. This second encoded register can be assigned an unique register select number of "01". Of course, the choice of the particular register select numbers mentioned above are purely arbitrary and can be easily changed to suit a particular user.

With the foregoing arrangement, polling of multiple registers connected to a local network takes place quickly and efficiently and accommodates the presence of a compound meter having two encoded registers.

Turning now to FIG. 8, there is shown in block diagram form, the basic elements comprising reader/programmer 1. Reader/programmer 1 comprises a microprocessor 64, preferably a Z8 processor manufactured by Zilog. Microprocessor 64 includes scratch pad memories, buffer memories, a clock, and input/output (I/O) circuitry for interfacing with external devices. The details of construction and operation of such a microprocessor is well-known and will not be described in any further detail here. A random access memory 65 is associated with microprocessor 64 for temporarily storing instructions or data processed by microprocessor 64. Microprocessor 64 also communicates with two wire input/output circuitry 67 and three wire/fourteen wire input/output circuitry 69, which are described in more detail below. A buzzer or other audible alarm sounding device 71 is connected to microprocessor 64 to sound an audible alarm under certain conditions. A keypad 73 is connected to microprocessor 64. Keypad 73 allows data or other information to be manually entered directly into microprocessor 64. A display 75, which corresponds generally to display 11 as shown in FIG. 1, is also connected to microprocessor 64 for visually displaying data or other information being processed or stored by microprocessor 64. Reader/programmer 1 may further include an RS232 (serial) input/output interface 77 which enables microprocessor 64 to be externally programmed and/or the contents of RAM 65 to be read out or altered via the output connector port 15 shown in FIG. 1.

Reader/programmer 1 includes a battery 79 which corresponds generally to power source 13 shown in FIG. 1. Battery 79 is preferably of the rechargeable nickel-cadmium type which supplies DC power to microprocessor 64, two wire I/O circuit 67, three wire/fourteen wire I/O circuit 69 and other related circuitry of reader/programmer 1. It should be noted that microprocessor 64 may include a function whereby the output voltage of battery 79 is monitored and an alarm, e.g. buzzer 71 and/or display 75, is activated if the output voltage of battery 79 should fall below a predetermined level, indicating a need for recharging. The watchdog timer which is included as part of microprocessor 64 may be set to remove power from most of the circuitry comprising reader/programmer 1 in the event power is left on but no activity is detected. This helps to save the energy stored in battery 79 in the event reader/programmer 1 is accidentally left on. In the event power is thus removed, only a minimal amount of current will be drawn from battery 79 sufficient to keep certain vital functions running e.g. the contents of RAM 65 and the clock and switched inputs to microprocessor 64.

When in the two wire mode, microprocessor 64 controls the operation of two wire I/O circuitry 67. Two wire I/O circuitry 67 includes a driver power supply circuit, a coil drive circuit, a demodulator circuit, miscellaneous logic circuitry, two wire I/O power supply circuitry, all as shown in more detail in FIG. 9. Both the coil drive circuitry and demodulator circuitry are coupled to drive coil 83. Preferably, drive coil 83 is formed as part of probe/adaptor 9, as shown in FIG. 1 and in more detail in FIG. 10. Drive coil 83 is formed as multi-turn loop of wire disposed at the end of probe/adaptor 9. A sensor switch 85 is located proximate drive coil 83. Sensor switch 85 is a normally-open mechanical silicone rubber switch with a conductive pad on the bottom. Sensor switch 85 is fully weather-sealed from the environment. The opposite end of probe/adaptor 9 contains four connectors, two of which are connected to drive coil 83 and two which are connected to sensor switch 85. These connectors in turn mate with connectors which comprise connector 3 of reader/programmer 1 (see FIG. 1). Connector 3 of reader/programmer 1 includes pin-type connectors for connecting to probe/adaptor 9, three wire receptacle 5 or a 14 pin receptacle (not shown) which is still employed on some older types of prior-art encoded meter registers. Upon contact of sensor switch 85 with the surface of the button-like inductive port 7 of two wire local network 43 shown in FIG. 1, the closure of switch 85 indicates to the two wire I/O circuitry 67 that probe/adaptor 9 is in contact with two wire port 7. Two wire port 7 is comprised of one or more turns of wiring. When drive coil 83 is brought into proximity with the coil forming part of port 7, the two coils are inductively coupled to each other.

The closure of sensor switch 85 causes two wire I/O circuitry 67 and microprocessor 64 to be activated for the purpose of either reading or programming any encoded registers connected to the two wire local network 43. It should be noted that reader/programmer 1 may further include a manual trigger 87 (see FIGS. 1 and 8) which is a normally-open switch that can be used to manually activate the two wire or three/fourteen wire I/O circuits 67 and 69 and microprocessor 64. Manual triggering of reader/programmer 1 can be used to override the touch sensitive triggering provided by sensor switch 85 when it is desired to manually activate reader/programmer 1. Manual triggering of reader/programmer 1 also acts a backup in case the touch-sensitive switch 85 should fail for some reason. Although touch-sensitive automatic switching using sensor switch 85 has been described primarily in connection with probe/adaptor 9 and two wire port 7, a touch-sensitive sensor switch of the same same type could be employed in connection with port 3 of reader/programmer 1 to enable automatic activation of reader/programmer 1 when connecting to a hard-wired three or fourteen wire receptacle 5, as shown in FIG. 1.

Although inductive coupling between reader/programmer 1 and 2 wire network 43 is shown in FIG. 1, it should also be noted that the output of two wire I/O circuitry 67 need not be connected via drive coil 83 to inductive port 7. Instead, the lines normally connected to drive coil 83 could be connected directly, (either permanently or removably) to two wire local network 43. In the normal two wire mode, reader/programmer 1 and the circuitry associated with the remote encoded register operate in a balanced mode when coupled through drive coil 83 and inductive port 7. If inductive coupling is not used, it is possible to connect the reader/programmer 1 directly to the two wire network 43. It is also possible for microprocessor unit U1 (FIG. 2) to turn on transistor Q1 (FIG. 4) via the DATA2 line to establish a reference to ground. This prevents interface circuit U2 (FIG. 4) from electrically "floating" when signals applied to terminals IN1 and IN2 of FIG. 4 are both low. This is used if both IN1 and IN2 are allowed to be low at the same time.

Interrogation and meter reading in the two wire mode will now be described in more detail. Referring to FIG. 9, two wire I/O circuitry 67 includes power supply circuitry 89 for supplying various regulated voltages to the remainder of two wire I/O circuitry 67. Power supply circuit 89 also provides a voltage reference, V2 used by other elements of two wire I/O circuitry 67.

A driver power supply 91 utilizes a switching regulator IC, U6, in combination with inductor L1 and diode D5 to form a step-up DC-to-DC convertor to produce an output DC voltage, Vdriver, for driving drive coil 83. Transistor Q1 of driver power supply 91 is the switching element for the DC-to-DC convertor.

Demodulator circuit 93 includes an oscillator having a crystal time base generated by crystal XT1 in connection with timing circuit U1. The output of the oscillator is fed to a switch capacitor filter device U5 having a cutoff frequency of approximately 1500 Hz. The frequency of the time base generated by the oscillator is set at approximately 100 times the cutoff frequency of the switched-capacitor filter, i.e. 150 kHz. Demodulator circuit 93 further includes a current sampling resistor R17. Current sampling resistor R17 is coupled to the coil drive circuitry 91 output, Vdriver, and drive coil 83. Changes in current applied to drive coil 83 are impressed across current sampling resistor R17 and applied to the switched capacitor filter device U5 which filters out high frequency elements associated with the clocking/interrogation signals applied to drive coil 83 by driver power supply 91. For example, these clocking/interrogation signals may be 19.2 kHz for normal interrogation mode signals and 38.4 kHz for the initial query/programming mode signals, as previously described. Generation of these signals is described in more detail below. The filtered output of switched-capacitor filter device U5 is amplified and then applied to a Schmidt trigger which detects any low frequency variations in the current sampled by the current sampling resistor R17. These sampled current changes are converted to voltage changes which are then compared with a reference voltage V2 at the Schmidtt trigger. The output of the Schmidt trigger, which is applied to a buffer device U2, is thus indicative of variations in the current drawn through drive coil 83 due to changes in impedance caused by biphase modulated signals being applied to the two wire local network 43 by the action of transistor pair Q2 of interface unit U2 of the encoded meter register circuitry (see FIGS. 2 and 4).

Microprocessor 64 utilizes a software phase-locked-loop algorithm in which the phase of data being derived from the current modulated signal by demodulator 93 is detected. This prevents any skew in the phases of the data being returned back from an encoded meter register from causing microprocessor 64 to not be able to accurately reconstruct the data.

An additional feature of the invention, when operated in the two wire mode, is that the coil drive circuit 95 and drive power supply 91 can detect if additional current is being drawn through the local two wire network 43 due to additional wiring being incorporated into the network. Since an individual local network 43 is apt to have different lengths of wiring from others, the amount of current drawn by a particular network, due to the impedance of the wires and their natural reactance at the interrogation/clock frequency of 19.2 kHz will also vary. Without adaptive compensation, as provided by the present invention, longer wiring runs would cause higher voltages to be induced at coil drive 83 and, hence, inductive port 7. These higher induced voltages may exceed the voltages which may be safely applied to the encoded register circuitry shown in FIG. 2.

Consequently, in the present invention, the amount of current being drawn through drive coil 83 is monitored and the drive signal is reduced when the amount of current drawn rises. This is accomplished through the provision of resistor R20 in the output of driver power supply 91. As additional current is drawn through R20 due to increasing reactance exhibited by local network 43, this will be reflected in an increased current drain supplied through resistor R20 which, in turn causes the voltage (approximately 15 volts) supplied through call driver circuit 91 to decrease to compensate for the reactance exhibited through local network 43.

Thus, the encoded meter register, specifically interface unit U2 shown in FIGS. 2 and 4, acts to vary the load or impedance connected to the two wire local network 43 and effectively modulates the current flowing through drive coil 83 in accordance with the biphase encoded ASCII data being applied to local network 43 and coupled to drive coil 83 via inductive port 7. Demodulator circuit 93 is used to detect variations in current being drawn through drive coil 83 by sampling this current through current sampling resistor R17, filtering the sampled signal via switched capacitor filter U5 and comparing the demodulated signal with a reference signal through the use of a Schmidt trigger to produce a demodulated data signal whenever such a change is detected.

The coil drive circuitry 95 is responsive to a two wire clock signal derived from microprocessor 64 and a "two wire enable" signal which is used to initiate transmission of the two wire clock (interrogation) signals through a pair of gates U2. When microprocessor 64 outputs a "two wire enable" signal along pin 6 (shown in FIG. 9), it places this enable line into a low state and allows the application of the approximately 15 volt output, of Vdriver, of driver power supply 91 to be applied to coil drive circuit 95 via current sampling resistor R17. The two wire enable signal is also coupled to timing generator U1 of demodulator circuit 93 which, in turn, enables operation of the switched capacitor filter device U5. The two wire enable signal therefore causes coil drive circuitry 95 to allow the passage of the 19.2 kHz clock/interrogation signal generated by microprocessor 64 to be applied to drive coil 83 and activates the demodulator circuit 93 to enable detection of any current-modulated signals being returned from an encoded register attached to local network 43.

Two wire I/O circuit 67 further includes some miscellaneous logic circuitry 97 which detect the status of the mechanical sensor switch 85 formed as part of the probe/adaptor 9. Circuitry 97 is also responsive to the actuation of manual trigger 87. Activation of trigger 87 may be used to cause reader/programmer unit 1 to display certain information when initially powered up, such as a unique ID or serial number for the reader/programmer 1, and any software revision numbers. When used in a polling mode, trigger 87 may be used to switch visual display 75 between one or two registers.

FIG. 11 shows in more detail the arrangement of circuitry comprising microprocessor 64. Microprocessor 64 (also labelled U1 Z8 in FIG. 11) is an 8 bit processor and has approximately 8,000 bits of onboard EEPROM memory available. Of course, if additional memory is required, it can be supplied in the form of RAM memory 65 or an auxiliary PROM or EEPROM for handling operating instructions.

Circuitry 99 is power supply circuitry associated with microprocessor 64. Circuitry 101 is for negative voltage generation (U3) and display compensation (Q2) for display 75.

Buzzer circuit 71 is comprised of a single transistor (Q1) which is actuated whenever a "buzzer enable" signal is output from microprocessor 64. This buzzer signal may be enabled whenever an alarm condition is detected by microprocessor 64, for example, the detection of a tamper indication signal from an encoded meter register, a low battery warning, an ambiguous meter register reading, etc.

The actuation of buzzer circuit 71 may also be used to indicate to the operator of reader/programmer 1 that a particular meter reading has been taken and it contains no errors. Of course, it is a simple matter to provide a second buzzer tone so that two different tones may be emitted by buzzer circuit 71. This way, error conditions can be differentiated from the sound emitted when a good reading is taken.

As previously mentioned, microprocessor 64 includes a software "watchdog" timer which monitors various functions of reader/programmer 1 and disables reader/programmer 1 in the event certain conditions arise. For example, upon initial power up, due to closure of sensor switch 85, microprocessor 64 will generate clock/interrogation signals which are applied to drive coil 83. If no data is detected from local network 43 after a predetermined period of time, the watchdog timer will cause the clock/interrogation signal to be turned off. This function can also be programmed so as to automatically turn the clock/interrogation signal on a second time, after temporarily turning it off, in the event the initial state of reader/programmer 1 or a remote meter register is awakened in an ambiguous state.

The arrangement shown in FIGS. 9 and 11 can also be adapted to read encoded meter registers over a three wire network, such as local network 27 shown in FIG. 1, or a fourteen wire network as shown in U.S. Pat. No. 4,085,287. In a fourteen wire arrangement as shown in U.S. Pat. No. 4,085,287, microprocessor 64 can be arranged to have ten switched inputs connected to conductive pads 57 (see FIG. 3) of the individual register display wheels, and four inputs connected to the four movable contacts 59 (for a four wheel register display). By strobing these four contacts, the status of each of the ten switch position lines (e.g. lines 1, 2, . . . 0 in FIG. 3) microprocessor 64 can determine the position of an individual display wheel. Alternatively, fourteen wire encoded registers may be read by implementing the reading circuitry described in U.S. Pat. No. 4,085,287 or the circuitry shown in FIG. 2. This circuitry can be incorporated as part of the three wire/fourteen wire I/O circuitry 69 shown in FIG. 8.

Three wire communications are implemented by reader/programmer 1 by the application of a clock signal, either derived from the two wire clock signal applied to coil drive circuit 95, or a separate clock generated directly by microprocessor 64. This signal is applied over the line labelled CLK in FIG. 8 and applied to input IN1 of interface circuitry U2 shown in FIG. 2. three wire data output from terminal IN2 of interface unit U2 (FIG. 2) is applied directly to microprocessor 64 or through appropriate signal buffers contained within the three wire/fourteen wire I/O unit 69. Reader/programmer 1 and the remotely interrogable meter register circuitry shown in FIG. 2 are also coupled to a common ground GND. Data in the three wire mode appears as an open collector on terminal IN2 of interface unit U2 (see FIG. 4) and is in standard ASCII format, as described previously. The interrogation/clock signal CLK applied to input IN1 of interface unit U2 shown in FIG. 2 preferably is running at a frequency of 1200 or 2400 Hz. Data output at terminal IN2 is synchronous with this clock signal. Normally, there will be a one-to-one relationship between the clock signal and the data signal in the three wire mode. However, it is possible to program microprocessor unit U1 of the encoded register (FIG. 2) to change this relationship. For example, one data bit could be output for every 16 clock signals input.

While the present invention has been described in considerable detail, other changes and modifications will be geared to those skilled in the art. Accordingly, the foregoing detailed description of the preferred embodiments are to be taken as illustrative but not limitive, of the scope of the invention which is defined by the appended claims.

What is claimed is:

1. An encoded register for communicating data from a utility meter or the like over at least two wire lines, comprising:
   encoder means, responsive to a quantity of a commodity being measured by the utility meter and to an external interrogate signal applied to the lines, for producing a modulated data signal indicative of the quantity and;
   means for applying the modulated data signal to the wire lines, the interrogate signal being modulated by the encoder means so as to vary the current flowing over the wire lines when the encoder means is coupled via two wire lines, so as to produce the modulated data signal, and the interrogate signal being used by the encoder means to generate a data signal whose characteristics are varied when the encoder means is coupled via at least three wire lines, so as to generate the modulated data signal.

2. The register of claim 1 wherein the encoded register is inductively coupled over two wire lines and wherein the encoded register includes means for varying an impedance in accordance with data representing the measured quantity to cause the current flowing over the wire lines to be modulated in accordance with the data.

3. The register of claim 1 wherein the encoded register is directly, electrically coupled to at least three wires, a first wire carrying external clock signals, a second line carrying data signals from the encoded register, and a third line constituting electrical ground, the clock signals being applied to the encoded register as the interrogate signal, the encoded register including means for varying characteristics of signals derived from the clock signals in accordance with data representing the measured quantity.

4. The system of claim 1 wherein at least two encoded registers are coupled via the same wire lines.

5. The register of claim 4 wherein each encoded register includes means for storing a series of data bits uniquely identifying the encoded register so as to enable external addressing of each of the unique series of bits to poll all encoded register coupled to the lines.

6. The register of claim 5 wherein the series of data bits is indicative of a register select number different from data bits stored by encoded register representing a register serial number.

7. The register of claim 4, wherein at least one encoded register further includes means for storing data bits indicative of the presence of at least an additional encoded register coupled to the at least one encoded register, whereby when the at least one encoded register is interrogated the data bits indicative of the additional encoder means are read out and, in response thereto, the additional encoded register is interrogated.

8. The register of claim 1 wherein the interrogate signal uses pulse-burst length encoding of interrogate signal data transmitted over the wire lines to the encoded register.

9. The register of claim 8 wherein the interrogate signal data is binary encoded data with a binary "1" represented by a series of interrogate signal pulses of a first predetermined length, and a binary "0" represented by a series of interrogate signal pulses of a second predetermined length.

10. The register of claim 1 wherein the encoded register includes non-volatile memory means for storing data indicative of one or more characteristics of the utility meter with which it is associated.

11. The register of claim 10 wherein the characteristic data include a meter serial number, meter type, and data indicative of the presence of a further encoded meter register.

12. The register of claim 10 wherein at least a portion of the memory means may be reprogrammed by means of a separate external programming signal applied to the encoded register over the wire lines.

13. The register of claim 12 wherein the interrogate signal uses pulse-burst length encoding of interrogate signal data applied to the encoded register.

14. The register of claim 13 wherein the interrogate signal data is binary encoded data with a binary "1" represented by a series of interrogate signal pulses of a first predetermined length, and a binary "0" represented by a series of interrogate signal pulses of a second predetermined length.

15. The register of claim 12 wherein the programming signal is a signal having a frequency different from the interrogate signal.

16. The register of claim 12 wherein the memory may be reprogrammed to include data indicative of a meter serial number, meter type, presence of a further encoded meter register, meter manufacturer, meter polling selection data, selection of two-wire or three-wire mode of operation, meter register resolution, data length, enable/disable pulse output, and a data checksum to enable data error detection of the contents of the memory.

17. The register of claim 12 wherein the memory means comprises an EEPROM and wherein the encoded register includes means for discriminating between the programming signal and the interrogate signal to place the encoded register in a programmable mode when the programming signal is detected whereby the contents of the EEPROM may be overwritten, and to place the encoded register in an interrogate mode when the interrogate signal is detected, whereby the contents of the EEPROM are read out and transmitted over the wire lines.

18. The register of claim 17 wherein the programming signal includes a unique initial series of data bits in response to which the EEPROM is enabled to allow the contents thereof to be overwritten.

19. The register of claim 17 wherein the programming signal includes data query bits in response to which the EEPROM transmits its stored contents over the wire lines.

20. The register of claim 1 wherein the utility meter includes a register having at least one display wheel for displaying the measured quantity and wherein the encoded register includes means for checking the position of the at least one register display wheel at least twice to ensure that the generated data signal is accurately indicative of the actual position of the register display wheel.

21. The register of claim 1 wherein the encoded register is connected to a communications port.

22. The register of claim 21 wherein the port comprises an inductive coil having two wires connected to the encoded register.

23. The register of claim 21 wherein the port comprises a receptacle having at least three electrical contacts disposed therein and connected via at least three wires to the encoded register.

24. The register of claim 1 wherein the interrogation signal is the sole source of power for the encoded register.

25. The register of claim 1 wherein the encoded register comprises an absolute encoder coupled to a display register associated with the utility meter.

26. The register of claim 1 wherein the utility meter includes means for producing switch closures at a rate proportional to a commodity being measured by the meter and the encoded register includes means for storing and transmitting data indicative of the switch closure rate over the lines in response to the interrogate signal.

27. The register of claim 26 wherein the encoded register is inductively coupled to at least two wire lines, the encoded register including means for generating data signals at two alternating and different frequencies indicative of the switch closure rate produced by the utility meter.

28. The register of claim 26 wherein the encoded register is directly, electrically coupled to three wire lines, the encoded register including means for producing a data pulse upon the accumulation of a predetermined number of switch closures from the utility meter.

29. The register of claim 1 wherein the utility meter includes means for producing pulses at a rate proportional to a commodity being measured by the meter and the encoded register includes means for storing and transmitting data indicative of the pulses over the wire lines in response to the interrogate signal.

30. The register of claim 29 wherein the encoded register is inductively coupled to two wire lines, the encoded register including means for generating data signals at two alternating and different frequencies indicative of the rate of pulses produced by the utility meter.

31. The register of claim 29 wherein the encoded register is directly, electrically connected to three wire lines, the encoded register including means for producing pulses from the utility meter.

* * * * *